(12) United States Patent
Wang et al.

(10) Patent No.: US 12,518,362 B2
(45) Date of Patent: Jan. 6, 2026

(54) IMAGE DYNAMIC RANGE PROCESSING METHOD AND APPARATUS

(71) Applicant: Huawei Technologies Co., Ltd., Guangdong (CN)

(72) Inventors: Yichuan Wang, Beijing (CN); Quanhe Yu, Beijing (CN); Hu Chen, Munich (DE); Weiwei Xu, Hangzhou (CN); Elena Alexandrovna Alshina, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 525 days.

(21) Appl. No.: 18/053,156

(22) Filed: Nov. 7, 2022

(65) Prior Publication Data
US 2023/0140259 A1 May 4, 2023

Related U.S. Application Data

(63) Continuation of application No. PCT/CN2021/083616, filed on Mar. 29, 2021.

(30) Foreign Application Priority Data

May 8, 2020 (CN) .......................... 202010383489.0

(51) Int. Cl.
*G06T 5/92* (2024.01)
*G06T 3/4007* (2024.01)
(Continued)

(52) U.S. Cl.
CPC .............. *G06T 5/92* (2024.01); *G06T 3/4007* (2013.01); *G06T 2207/10024* (2013.01); *G06T 2207/20208* (2013.01)

(58) Field of Classification Search
CPC ................... G06T 5/92; G06T 3/4007; G06T 2207/10024; G06T 2207/20208; G06T 5/40; G06T 5/90
See application file for complete search history.

(56) References Cited

U.S. PATENT DOCUMENTS 6,766,068 B2 * 7/2004 Aoyama ................. G06T 3/403
382/199
8,576,255 B2 * 11/2013 Katayama .............. G09G 3/006
345/214
(Continued)

FOREIGN PATENT DOCUMENTS

CN 102231264 A 11/2011
CN 103281537 A 9/2013
(Continued)

OTHER PUBLICATIONS

Report ITU-R BT.2408-0(Oct. 2017), Operational practices in HDR television production, BT Series Broadcasting service (television), 19 pages.
(Continued)

*Primary Examiner* — Stephen R Koziol
*Assistant Examiner* — Joshua Chen
(74) *Attorney, Agent, or Firm* — WOMBLE BOND DICKINSON (US) LLP

(57) ABSTRACT

This application provides an image dynamic range processing method and apparatus. The method includes: obtaining a first coordinate value of a first interpolation point and a first coordinate value of a third interpolation point related to a first cubic spline curve; and determining, based on histogram information of a first luminance interval of a to-be-processed image, a first coordinate value of a second interpolation point related to the first cubic spline curve. The first luminance interval is an interval between the first coordinate value of the first interpolation point and the first coordinate value of the third interpolation point. The first coordinate value of the first interpolation point, the first coordinate value of the second interpolation point, and the first coordinate value of the third interpolation point are used to determine a function of the first cubic spline curve.

20 Claims, 8 Drawing Sheets

(51) Int. Cl.
   *G06T 5/40*      (2006.01)
   *G06T 5/90*      (2024.01)

(56) References Cited

U.S. PATENT DOCUMENTS 10,467,735 B2 * 11/2019 Pouli .......................... G06T 7/90
2009/0067713 A1 * 3/2009 Chen .................... H04N 1/4074
                                                        382/169

FOREIGN PATENT DOCUMENTS

| CN | 109785239 A      | 5/2019 |            |
|----|------------------|--------|------------|
| CN | 112215760 A      | 1/2021 |            |
| CN | 113628106 B      | 1/2025 |            |
| JP | 2005011585 A     | 1/2005 |            |
| JP | 2009182599 A     | 8/2009 |            |
| JP | 2010074222 A     | 4/2010 |            |
| WO | WO-2018111682 A1 * | 6/2018 | ............... G06T 5/92 |

OTHER PUBLICATIONS

SMPTE ST 2094-10:2016, SMPTE Standard Dynamic Metadata for Color Volume Transform—Application #1, 15 pages.
SMPTE ST 2094-40:2016, SMPTE Standard Dynamic Metadata for Color Volume Transform—Application #4, 26 pages.

* cited by examiner

IMAGE DYNAMIC RANGE PROCESSING METHOD AND APPARATUS

CROSS-REFERENCE TO RELATED APPLICATIONS

This application is a continuation of International Application No. PCT/CN2021/083616, filed on Mar. 29, 2021, which claims priority to Chinese Patent Application No. 202010383489.0, filed on May 8, 2020. The disclosures of the aforementioned applications are hereby incorporated by reference in their entireties.

TECHNICAL FIELD

This application relates to the field of image processing, and in particular, to an image dynamic range processing method and apparatus.

BACKGROUND

A dynamic range (DR) indicates a ratio of a maximum value to a minimum value of a variable in many fields. In a digital image, the dynamic range indicates a ratio of maximum luminance to minimum luminance in an image displayable range. In other words, the dynamic range indicates a quantity of grayscale levels of the image from "brightest" to "darkest". A larger dynamic range of an image indicates richer luminance levels and more vivid visual effect of the image. The dynamic range of natural scenes in the real world is $10^{-3}$ to $10^6$, which is very large. Therefore, the dynamic range is referred to as a high dynamic range (HDR). Compared with a high dynamic range image, a common image has a low dynamic range (LDR).

Generally, an existing display device whose dynamic range is less than 0.1 nits to 400 nits is referred to as a standard dynamic range (SDR) display device, and an existing display device whose dynamic range is greater than 0.01 nits to 540 nits is referred to as a high dynamic range (HDR) display device. Different high dynamic range display devices display in different dynamic ranges, for example, a high dynamic range display device whose dynamic range is 0.01 nits to 540 nits, and a high dynamic range display device whose dynamic range is 0.005 nits to 1000 nits. Similarly, different standard dynamic range display devices also display in different dynamic ranges. To enable an image to adapt to display devices with different dynamic ranges (a high dynamic range display device and a low dynamic range display device), dynamic range adjustment (compression or stretching) needs to be performed on the image, so that the dynamic range of the image is adjusted to a displayable range of the display device to display the image.

In a conventional technology, a luminance value of each pixel in an image is mapped to a target luminance value based on a mapping curve, so that a dynamic range of the image is adjusted by changing the luminance value of the pixel. However, because a form of an existing mapping curve is not flexible enough, luminance levels of some regions in the image are lost, and luminance contrast is not obvious. As a result, the image with the adjusted dynamic range has poor display effect.

SUMMARY

This application provides an image dynamic range processing method and apparatus, to improve display effect of an image.

According to a first aspect, an image dynamic range processing method is provided. The method includes: obtaining a first coordinate value of a first interpolation point and a first coordinate value of a third interpolation point related to a first cubic spline curve, where the first coordinate value of the first interpolation point and the first coordinate value of the third interpolation point are luminance values; and determining, based on histogram information of a first luminance interval of a to-be-processed image, a first coordinate value of a second interpolation point related to the first cubic spline curve, where the first luminance interval is an interval between the first coordinate value of the first interpolation point and the first coordinate value of the third interpolation point, the first coordinate value of the first interpolation point, the first coordinate value of the second interpolation point, and the first coordinate value of the third interpolation point are used to determine a function of the first cubic spline curve, and the function of the first cubic spline curve is used to map a luminance value of a pixel whose luminance value is in the first luminance interval in the to-be-processed image to a first target luminance value, to modify a dynamic range of the to-be-processed image.

The first coordinate value of the second interpolation point may be determined by obtaining the first coordinate value of the first interpolation point and the first coordinate value of the third interpolation point and based on the histogram information of the first luminance interval of the to-be-processed image. A manner of determining the interpolation point is simple and easy to implement. In addition, the function of the first cubic spline curve is determined by determining the first coordinate values of the first interpolation point to the third interpolation point related to the first cubic spline curve and based on the first coordinate values of the first interpolation point to the third interpolation point. Then, the luminance value of the pixel whose luminance value is in the first luminance interval of the to-be-processed image is mapped to a first target pixel value based on the function of the first cubic spline curve. In other words, luminance values of some pixels in the to-be-processed image are mapped based on the function of the first cubic spline curve. This protects pixels in the first luminance interval and improves display effect of the image. In addition, compared with that luminance mapping is performed on a to-be-processed image only based on a basic mapping curve, this application performs luminance mapping on some pixels based on the function of the first cubic spline curve, and maps luminance values of remaining pixels based on the basic mapping curve. This means that an original mapping relationship of a curve segment on the basic mapping curve is changed. In other words, a form of a curve segment corresponding to the first luminance interval on the basic mapping curve is changed. This protects a specific region, improves diversity, flexibility, robustness, and universality of the form of the basic mapping curve, and further improves display effect of the image with the adjusted dynamic range.

In an implementation, the function of the first cubic spline curve is obtained in the following manner: obtaining a function of the basic mapping curve; mapping the first coordinate value of the first interpolation point and the first coordinate value of the third interpolation point based on the function of the basic mapping curve, to obtain a second coordinate value of the first interpolation point and a second coordinate value of the third interpolation point; determining a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point; and determining the function of the first cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

In an implementation, the determining a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point includes: determining the second coordinate value of the second interpolation point according to the following equation:

$$VA2 = VA1 + \frac{(TH2 - TH1) \times (VA3 - VA1)}{TH3 - TH1}$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point.

In an implementation, the method further includes: determining, based on the first coordinate value of the third interpolation point and a maximum RGB component value of a first pixel of the to-be-processed image, first coordinate values of a fourth interpolation point, a fifth interpolation point, and a sixth interpolation point related to a second cubic spline curve. The first pixel is a pixel with a largest maximum RGB component value in the to-be-processed image. The maximum RGB component value of the pixel is a largest value of an R component, a G component, and a B component of the pixel. The first coordinate value of the fourth interpolation point, the first coordinate value of the fifth interpolation point, and the first coordinate value of the sixth interpolation point are used to determine a function of the second cubic spline curve. The function of the second cubic spline curve is used to map a luminance value of a pixel whose luminance value is in a second luminance interval in the to-be-processed image to a second target luminance value, to modify the dynamic range of the to-be-processed image. The second luminance interval is an interval between the first coordinate value of the fourth interpolation point and the first coordinate value of the sixth interpolation point. The first luminance interval and the second luminance interval do not overlap.

In an implementation, the method further includes: sending the functions of the cubic spline curves and data information of the to-be-processed image to a decoder, so that the decoder modifies the dynamic range of the to-be-processed image based on the functions of the cubic spline curves. The data information of the to-be-processed image is used to obtain the to-be-processed image.

In an implementation, the obtaining a first coordinate value of a first interpolation point and a first coordinate value of a third interpolation point related to a first cubic spline curve includes: setting the first coordinate value of the first interpolation point to a first preset luminance value, and setting the first coordinate value of the third interpolation point to a second preset luminance value.

In an implementation, the first coordinate value of the second interpolation point is determined according to the following equation:

$$TH2 = \frac{\sum_{i=0}^{N_{frame}} f(i)}{N_{frame}}$$

Herein, TH2 is the first coordinate value of the second interpolation point, $N_{frame}$ is a total quantity of pixels whose luminance values are in the first luminance interval in the to-be-processed image, i is an $i^{th}$ pixel in the pixels whose luminance values are in the first luminance interval in the to-be-processed image, and f(i) is a luminance value of the $i^{th}$ pixel.

In an implementation, the determining, based on the first coordinate value of the third interpolation point and a maximum RGB component value of a first pixel of the to-be-processed image, first coordinate values of a fourth interpolation point, a fifth interpolation point, and a sixth interpolation point related to a second cubic spline curve includes: determining the first coordinate value of the fourth interpolation point according to a first equation, where the first equation is:

$$TH1\_lug = TH3 + \frac{(MaxSource - TH3) \times (U - 2)}{U};$$

determining the first coordinate value of the fifth interpolation point according to a second equation, where the second equation is:

$$TH2\_high = TH3 + \frac{(MaxSource - TH3) \times (U - 1)}{U}, \text{ and}$$

setting the first coordinate value of the sixth interpolation point to the maximum RGB component value of the first pixel.

Herein, TH1_high is the first coordinate value of the fourth interpolation point, TH2_high is the first coordinate value of the fifth interpolation point, a value of MaxSource is the maximum RGB component value of the first pixel, THB is the first coordinate value of the third interpolation point, and U is a preset value.

In an implementation, the determining, based on the first coordinate value of the third interpolation point and a maximum RGB component value of a first pixel of the to-be-processed image, first coordinate values of a fourth interpolation point, a fifth interpolation point, and a sixth interpolation point related to a second cubic spline curve includes: determining an initial value of the first coordinate value of the fourth interpolation point based on the first coordinate value of the third interpolation point and the maximum RGB component value of the first pixel; setting the first coordinate value of the sixth interpolation point to the maximum RGB component value of the first pixel; determining a first pixel quantity and a second pixel quantity based on the initial value of the first coordinate value of the fourth interpolation point and the first coordinate value of the sixth interpolation point, where the first pixel quantity is a quantity of pixels whose luminance values are in a third luminance interval in the to-be-processed image, the third luminance interval is an interval between the initial value of the first coordinate value of the fourth interpolation point and the first coordinate value of the sixth interpolation point, and the second pixel quantity is a total quantity of pixels in the to-be-processed image or in a luminance histogram of the to-be-processed image; determining the first coordinate value of the fourth interpolation point based on the first pixel quantity; the second pixel quantity, the first coordinate value of the third interpolation point, the initial value of the first coordinate value of the fourth interpolation point, and the first coordinate value of the sixth interpolation point; and determining the first coordinate value of the fifth interpolation point based on histogram information of the second luminance interval of the to-be-processed image, the first coordinate value of the fourth interpolation point, and the first coordinate value of the sixth interpolation point.

In an implementation, the second luminance interval includes N subintervals, and N is a positive integer. The determining the first coordinate value of the fifth interpolation point based on histogram information of the second luminance interval of the to-be-processed image, the first coordinate value of the fourth interpolation point, and the first coordinate value of the sixth interpolation point includes: determining an $i^{th}$ subinterval from the N subintervals, where the $i^{th}$ subinterval is in n subintervals of the N subintervals, a sequence number of the n subintervals is greater than or equal to N/4, the sequence number of the n subintervals is less than or equal to 3N/4, and a quantity of pixels whose luminance values are in the $i^{th}$ subinterval in the to-be-processed image is a smallest value in the n subintervals; and determining the first coordinate value of the fifth interpolation point based on the first coordinate value of the fourth interpolation point, the first coordinate value of the sixth interpolation point, and i.

In an implementation, a value of N is 8.

In an implementation, the determining an initial value of the first coordinate value of the fourth interpolation point based on the first coordinate value of the third interpolation point and the maximum RGB component value of the first pixel includes: determining the initial value of the first coordinate value of the fourth interpolation point according to the following equation:

$$TH1\_high1 = TH3 + \frac{(MaxSource - TH3) \times (U - 2)}{U}$$

Herein, TH1_high1 is the initial value of the first coordinate value of the fourth interpolation point, a value of MaxSource is the maximum RGB component value of the first pixel, U is a preset value, and THB is the first coordinate value of the third interpolation point.

In an implementation, the determining the first coordinate value of the fourth interpolation point based on the first pixel quantity, the second pixel quantity, the first coordinate value of the third interpolation point, the initial value of the first coordinate value of the fourth interpolation point, and the first coordinate value of the sixth interpolation point includes: determining a ratio of a length of the third luminance interval to the maximum RGB component value of the first pixel; and determining the first coordinate value of the fourth interpolation point according to the following equation:

$$TH1\_high1 = TH3 + \frac{(MaxSource - TH3) \times (U - 2)}{U} - POW\left(\frac{highRatio}{wholeratio}, j\right) \times \frac{MaxSource - TH3}{U}$$

Herein, TH1_high is the first coordinate value of the fourth interpolation point, a value of MaxSource is the maximum RGB component value of the first pixel, U is a preset value, THB is the first coordinate value of the third interpolation point, highRatio is a ratio of the first pixel quantity to the second pixel quantity, $$wholeratio = \frac{TH3\_high - TH1\_high1}{MaxSource},$$

wholeratio is the ratio of the length of the third luminance interval to the maximum RGB component value of the first pixel, TH1_high1 is the initial value of the first coordinate value of the fourth interpolation point, TH3_high is the first coordinate value of the sixth interpolation point, and POW (x, j) indicates the $j^{th}$ power of x.

In an implementation, the determining the first coordinate value of the fifth interpolation point based on the first coordinate value of the fourth interpolation point, the first coordinate value of the sixth interpolation point, and i includes:

determining the first coordinate value of the fifth interpolation point according to the following equation:

$$TH2\_high = TH1\_high + (TH3\_high - TH1\_high) \times \frac{n\_min}{N} + \frac{(TH3\_high - TH1\_high)}{2N}$$

Herein, TH2_high is the first coordinate value of the fifth interpolation point, TH1_high is the first coordinate value of the fourth interpolation point, TH3_high is the first coordinate value of the sixth interpolation point, and n_min is i.

In an implementation, the method further includes: determining a third pixel quantity and a fourth pixel quantity based on a luminance histogram of the to-be-processed image, the first coordinate value of the fourth interpolation point, the first coordinate value of the fifth interpolation point, and the first coordinate value of the sixth interpolation point, where the third pixel quantity is a quantity of pixels in an interval between the first coordinate value of the fourth interpolation point and the first coordinate value of the fifth interpolation point in the luminance histogram, and the fourth pixel quantity is a quantity of pixels in an interval between the first coordinate value of the fifth interpolation point and the first coordinate value of the sixth interpolation point in the luminance histogram; and determining adjustment strength of a second coordinate value of the fifth interpolation point based on the third pixel quantity and the fourth pixel quantity, where the adjustment strength indicates an offset degree of the second coordinate value of the fifth interpolation point relative to an initial value of the second coordinate value of the fifth interpolation point.

In an implementation, the determining adjustment strength of a second coordinate value of the fifth interpolation point based on the third pixel quantity and the fourth pixel quantity includes: determining the adjustment strength of the second coordinate value of the fifth interpolation point according to the following equation:

$$TH3\_high\_strength = \begin{cases} TH\_high\_strength1 + \Delta, & 2NUM1 < NUM2 \\ TH\_high\_strength1 + 2\Delta, & 2NUM1 < NUM2 \end{cases}$$

Herein, TH_high_strength is the adjustment strength of the second coordinate value of the fifth interpolation point, TH_high_strength1 is a default value of the adjustment strength of the second coordinate value of the fifth interpolation point, Z is an adjustment operation, NUM1 is the third pixel quantity, and NUM2 is the fourth pixel quantity.

In an implementation, the initial value of the second coordinate value of the fifth interpolation point is obtained according to the following equation:

$$VA2\_high1 = VA1\_high + \frac{(TH2\_high - TH1\_high) \times (VA3\_high1 - VA1\_high)}{TH3\_high - TH1\_high}$$

Herein, VA2_high1 is the initial value of the second coordinate value of the fifth interpolation point, VA1_high is a second coordinate value of the fourth interpolation point, VA3_high is a second coordinate value of the sixth interpolation point, TH2_high is the first coordinate value of the fifth interpolation point, TH1_high is the first coordinate value of the fourth interpolation point, and TH3_high is the first coordinate value of the sixth interpolation point.

In an implementation, the function of the basic mapping curve is used to map a luminance value of a pixel in the to-be-processed image to a third target luminance value. The function of the basic mapping curve is a luminance mapping function in which the luminance value of the pixel in the to-be-processed image is an independent variable and the third target luminance value is a dependent variable. The luminance mapping function is expressed as follows:

$$L' = a \times \left( \frac{p \times L^n}{(p-1) \times L^n + 1} \right)^m + b$$

Parameters of the luminance mapping function include a, b, p, m, and n, L' is the third target luminance value, and L is the luminance value of the pixel in the to-be-processed image.

According to a second aspect, an image dynamic range processing method is provided. The method includes: obtaining a maximum RGB component value of a first pixel of a to-be-processed image, where the first pixel is a pixel with a largest maximum RGB component value in the to-be-processed image, and the maximum RGB component value of the pixel is a largest value of an R component, a G component, and a B component of the pixel; and determining, based on the maximum RGB component value of the first pixel and a luminance histogram of the to-be-processed image, a first coordinate value of an interpolation point related to at least one cubic spline curve. The interpolation point related to each cubic spline curve includes a first interpolation point, a second interpolation point, and a third interpolation point. The first coordinate value of the interpolation point is a luminance value. The first coordinate value of the interpolation point related to each cubic spline curve is used to determine a function of the corresponding cubic spline curve. The function of each cubic spline curve is used to map a luminance value of a pixel whose luminance value is in a corresponding first luminance interval in the to-be-processed image to a first target luminance value, to modify a dynamic range of the to-be-processed image. The first luminance interval corresponding to the function of the cubic spline curve is an interval between a first coordinate value of the first interpolation point and a first coordinate value of the third interpolation point related to the cubic spline curve.

The first coordinate value of the interpolation point related to the at least one cubic spline curve may be determined by obtaining the maximum RGB component value of the first pixel of the to-be-processed image and based on the maximum RGB component value of the first pixel and the luminance histogram of the to-be-processed image. A manner of determining the interpolation point is simple and easy to implement. In addition, the function of the cubic spline curve is determined by determining the first coordinate values of the first interpolation point to the third interpolation point related to the cubic spline curve and based on the first coordinate values of the first interpolation point to the third interpolation point. Then, the luminance value of the pixel whose luminance value is in the first luminance interval of the to-be-processed image is mapped to a first target pixel value based on the function of the cubic spline curve. In other words, luminance values of some pixels in the to-be-processed image are mapped based on the function of the cubic spline curve. This protects pixels in the first luminance interval and improves display effect of the image. In addition, compared with that luminance mapping is performed on a to-be-processed image only based on a basic mapping curve, this application performs luminance mapping on some pixels based on the function of the cubic spline curve, and maps luminance values of remaining pixels based on the basic mapping curve. This means that an original mapping relationship of a curve segment on the basic mapping curve is changed. In other words, a form of a curve segment corresponding to the first luminance interval on the basic mapping curve is changed. This protects a specific region, improves diversity, flexibility, robustness, and universality of the form of the basic mapping curve, and further improves display effect of the image with the adjusted dynamic range.

In an implementation, a quantity of the cubic spline curve is one. The determining, based on the maximum RGB component value of the first pixel and a luminance histogram of the to-be-processed image, a first coordinate value of an interpolation point related to at least one cubic spline curve includes: determining, based on the luminance histogram, a maximum RGB component value of a second pixel corresponding to a first percentage, a maximum RGB component value of a third pixel corresponding to a second percentage, and a maximum RGB component value of a fourth pixel corresponding to a third percentage, where the first percentage indicates a percentage of pixels whose maximum RGB component value is less than or equal to the maximum RGB component value of the second pixel in a plurality of pixels in the to-be-processed image, the second percentage indicates a percentage of pixels whose maximum RGB component value is less than or equal to the maximum RGB component value of the third pixel in the plurality of pixels in the to-be-processed image, and the third percentage indicates a percentage of pixels whose maximum RGB component value is less than or equal to the maximum RGB component value of the fourth pixel in the plurality of pixels in the to-be-processed image; determining the first coordinate value of the first interpolation point based on the maximum RGB component value of the second pixel corresponding to the first percentage, the maximum RGB component value of the third pixel corresponding to the second percentage, and the maximum RGB component value of the fourth pixel corresponding to the third percentage; setting the first coordinate value of the third interpolation point to the maximum RGB component value of the first pixel; and determining a first coordinate value of the second interpolation point based on the first coordinate value of the first interpolation point, the first coordinate value of the third interpolation point, and histogram information corresponding to the first luminance interval in the luminance histogram.

In an implementation, the determining the first coordinate value of the first interpolation point based on the maximum RGB component value of the second pixel corresponding to the first percentage, the maximum RGB component value of the third pixel corresponding to the second percentage, and the maximum RGB component value of the fourth pixel corresponding to the third percentage includes: determining a first value of the first coordinate value of the first interpolation point based on the maximum RGB component value of the second pixel corresponding to the first percentage, the maximum RGB component value of the third pixel corresponding to the second percentage, and a luminance threshold; and determining the first coordinate value of the first interpolation point based on the maximum RGB component value of the second pixel corresponding to the first percentage, the maximum RGB component value of the third pixel corresponding to the second percentage, the maximum RGB component value of the fourth pixel corresponding to the third percentage, and the first value.

In an implementation, the first percentage is 90%, the second percentage is 95%, and the third percentage is 99%. The determining a first value of the first coordinate value of the first interpolation point based on the maximum RGB component value of the second pixel corresponding to the first percentage, the maximum RGB component value of the third pixel corresponding to the second percentage, and a luminance threshold includes: determining the first value of the first coordinate value of the first interpolation point according to the following equation:

$$TH1\_used1 = \frac{\left(g\_maxRGBdistribution90 + \frac{g\_maxRGBdistribution95 - g\_maxRGBdistribution90}{2.0}\right)}{THRESOLD}$$

Herein, TH1_used1 is the first value, g_maxRGBdistribution90 is the maximum RGB component value of the second pixel corresponding to 90%, g_maxRGBdistribution95 is the maximum RGB component value of the third pixel corresponding to 95%, and THRESOLD is the luminance threshold.

In an implementation, the determining the first coordinate value of the first interpolation point based on the maximum RGB component value of the second pixel corresponding to the first percentage, the maximum RGB component value of the third pixel corresponding to the second percentage, the maximum RGB component value of the fourth pixel corresponding to the third percentage, and the first value includes: determining a difference between twice the maximum RGB component value of the third pixel corresponding to the second percentage and the maximum RGB component value of the second pixel corresponding to the first percentage; determining whether the maximum RGB component value of the fourth pixel corresponding to the third percentage is greater than a sum of the obtained difference and a first preset value, and whether the first value is greater than a first threshold; and if yes, setting the first coordinate value of the first interpolation point to the first value.

In an implementation, the determining the first coordinate value of the first interpolation point based on the maximum RGB component value of the second pixel corresponding to the first percentage, the maximum RGB component value of the third pixel corresponding to the second percentage, and the maximum RGB component value of the fourth pixel corresponding to the third percentage includes: determining, based on the luminance histogram of the to-be-processed image, a maximum RGB component value of a fifth pixel corresponding to a fourth percentage, a maximum RGB component value of a sixth pixel corresponding to a fifth percentage, and a maximum RGB component value of a seventh pixel corresponding to a sixth percentage, where the fourth percentage indicates a percentage of pixels whose maximum RGB component value is less than or equal to the maximum RGB component value of the fifth pixel in a plurality of pixels in the to-be-processed image, the fifth percentage indicates a percentage of pixels whose maximum RGB component value is less than or equal to the maximum RGB component value of the sixth pixel in the plurality of pixels in the to-be-processed image, and the sixth percentage indicates a percentage of pixels whose maximum RGB component value is less than or equal to the maximum RGB component value of the seventh pixel in the plurality of pixels in the to-be-processed image; determining a first value of the first coordinate value of the first interpolation point based on the maximum RGB component value of the fifth pixel corresponding to the fourth percentage, the maximum RGB component value of the second pixel corresponding to the first percentage, and a luminance threshold; determining a second value of the first coordinate value of the first interpolation point based on the maximum RGB component value of the second pixel corresponding to the first percentage, the maximum RGB component value of the third pixel corresponding to the second percentage, and the luminance threshold; determining a third value of the first coordinate value of the first interpolation point based on the maximum RGB component value of the third pixel corresponding to the second percentage, the maximum RGB component value of the fourth pixel corresponding to the third percentage, and the luminance threshold; and determining the first coordinate value of the first interpolation point based on the maximum RGB component value of the fifth pixel corresponding to the fourth percentage, the maximum RGB component value of the sixth pixel corresponding to the fifth percentage, the maximum RGB component value of the second pixel corresponding to the first percentage, the maximum RGB component value of the third pixel corresponding to the second percentage, the maximum RGB component value of the fourth pixel corresponding to the third percentage, the maximum RGB component value of the seventh pixel corresponding to the sixth percentage, and the first value to the third value.

In an implementation, the first percentage is 90%, the second percentage is 95%, the third percentage is 99%, the fourth percentage is 50%, the fifth percentage is 10%, and the sixth percentage is 100%. The determining a first value of the first coordinate value of the first interpolation point includes: determining the first value of the first coordinate value of the first interpolation point according to a first equation, where the first equation is:

$$TH1\_used1 = \frac{\left(g\_maxRGBdistribution50 + \frac{g\_maxRGBdistribution90 - g\_maxRGBdistribution50}{2.0}\right)}{THRESOLD}$$

the determining a second value of the first coordinate value of the first interpolation point includes: determining the second value of the first coordinate value of the first interpolation point according to a second equation, where the second equation is:

$$TH1\_used2 = \frac{\left(g\_maxRGBdistribution90 + \frac{g\_maxRGBdistribution95 - g\_maxRGBdistribution90}{2.0}\right)}{THRESOLD}$$

and
the determining a third value of the first coordinate value of the first interpolation point includes: determining the third value of the first coordinate value of the first interpolation point according to a third equation, where the third equation is:

$$TH1\_used3 = \frac{\left(g\_maxRGBdistribution95 + \frac{g\_maxRGBdistribution99 - g\_maxRGBdistribution95}{2.0}\right)}{THRESOLD}$$

Herein, $TH1\_used1$ is the first value, $TH1\_used2$ is the second value, $TH1\_used3$ is the third value, $g\_maxRGBdistribution90$ is the maximum RGB component value of the second pixel corresponding to 90%, $g\_maxRGBdistribution95$ is the maximum RGB component value of the third pixel corresponding to 95%, $g\_maxRGBdistribution50$ is the maximum RGB component value of the fifth pixel corresponding to 50%, $g\_maxRGBdistribution99$ is the maximum RGB component value of the fourth pixel corresponding to 99%, $g\_maxRGBdistribution10$ is the maximum RGB component value of the sixth pixel corresponding to 10%, and THRESOLD is the luminance threshold.

In an implementation, the determining the first coordinate value of the first interpolation point includes: determining an initial value of the first coordinate value of the first interpolation point according to a fourth equation:

$$TH1\_used = \begin{cases} TH1\_used, \ g\_maxRGBdistribution90 > g\_maxRGBdistribution50 - g\_maxRGBdistribution10 + g\_maxRGBdistribution50 + 100 \\ TH2\_used, \ g\_maxRGBdistribution99 > g\_maxRGBdistribution95 - g\_maxRGBdistribution90 + g\_maxRGBdistribution50 + 100 \\ TH3\_used, \ g\_maxRGBdistribution100 > \frac{g\_maxRGBdistribution99 - g\_maxRGBdistribution95}{4.0} + g\_maxRGBdistribution99 + 100 \end{cases} ;$$

and
determining the first coordinate value of the first interpolation point based on the initial value of the first coordinate value of the first interpolation point, the second value, and the third value according to a fifth equation:

$$TH1 = \begin{cases} TH1\_used, \ TH1\_used \geq TH1\_used \\ TH1\_used2, \ 0.35 > TH1\_used \ and \ TH2\_used2 > 0.35 \\ TH1\_used3, \ 0.35 > TH1\_used \ and \ 0.35 \ TH1\_used2 \ and \ TH2\_used3 > 0.35 \end{cases}$$

Herein, TH1 is the first coordinate value of the first interpolation point, TH1_used is the initial value of the first coordinate value of the first interpolation point, TH1_used1 is the first value, TH1_used2 is the second value, TH1_used3 is the third value, g_maxRGBdistribution90 is the maximum RGB component value of the second pixel corresponding to 90%, g_maxRGBdistribution95 is the maximum RGB component value of the third pixel corresponding to 95%, g_maxRGBdistribution50 is the maximum RGB component value of the fifth pixel corresponding to 50%, g_maxRGBdistribution99 is the maximum RGB component value of the fourth pixel corresponding to 99%, g_maxRGBdistribution10 is the maximum RGB component value of the sixth pixel corresponding to 10%, and g_maxRGBdistribution100 is the maximum RGB component value of the seventh pixel corresponding to 100%.

In an implementation, the first luminance interval includes N subintervals, and N is a positive integer. The determining a first coordinate value of the second interpolation point based on the first coordinate value of the first interpolation point, the first coordinate value of the third interpolation point, and histogram information corresponding to the first luminance interval in the luminance histogram includes: determining an $i^{th}$ subinterval from the N subintervals, where the $i^{th}$ subinterval is in n subintervals of the N subintervals, a sequence number of the n subintervals is greater than or equal to N/4, the sequence number of the n subintervals is less than or equal to 3N/4, and a quantity of pixels whose luminance values are in the $i^{th}$ subinterval in the to-be-processed image is a smallest value in the n subintervals; and determining the first coordinate value of the second interpolation point based on the first coordinate value of the first interpolation point, the first coordinate value of the third interpolation point, and i.

In an implementation, a value of N is 8.

In an implementation, the determining the first coordinate value of the second interpolation point based on the first coordinate value of the first interpolation point, the first coordinate value of the third interpolation point, and i includes:

determining the first coordinate value of the second interpolation point according to the following equation:

$$TH2 = TH1 + (TH3 - TH1) \times \frac{n\_min}{N} + \frac{(TH3 - TH1)}{2N}$$

Herein, TH2 is the first coordinate value of the second interpolation point, TH1 is the first coordinate value of the first interpolation point, TH3 is the first coordinate value of the third interpolation point, and n_min is i.

In an implementation, the function of the cubic spline curve is obtained in the following manner: obtaining a function of the basic mapping curve: mapping the first coordinate value of the first interpolation point and the first coordinate value of the third interpolation point based on the function of the basic mapping curve, to obtain a second coordinate value of the first interpolation point and a second coordinate value of the third interpolation point; determining a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point; and determining the function of the cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

In an implementation, the determining a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point includes: determining the second coordinate value of the second interpolation point according to the following equation:

$$VA2 = VA1 + \frac{(TH2 - TH1) \times (VA3 - VA1)}{TH3 - TH1}$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point.

In an implementation, the function of the basic mapping curve is used to map a luminance value of a pixel in the to-be-processed image to a second target luminance value. The function of the basic mapping curve is a luminance mapping function in which the luminance value of the pixel in the to-be-processed image is an independent variable and the second target luminance value is a dependent variable. The luminance mapping function is expressed as follows:

$$L' = a \times \left( \frac{p \times L^n}{(p-1) \times L^n + 1} \right)^m + b$$

Parameters of the luminance mapping function include a, b, p, m, and n, L' is the second target luminance value, and L is the luminance value of the pixel in the to-be-processed image.

In an implementation, the method further includes: determining a first pixel quantity and a second pixel quantity based on the luminance histogram of the to-be-processed image, the first coordinate value of the first interpolation point, the first coordinate value of the second interpolation point, and the first coordinate value of the third interpolation point, where the first pixel quantity is a quantity of pixels in an interval between the first coordinate value of the first interpolation point and the first coordinate value of the second interpolation point in the luminance histogram, and the second pixel quantity is a quantity of pixels in an interval between the first coordinate value of the second interpolation point and the first coordinate value of the third interpolation point in the luminance histogram; and determining adjustment strength of a second coordinate value of the second interpolation point based on the first pixel quantity and the second pixel quantity, where the adjustment strength indicates an offset degree of the second coordinate value of the second interpolation point relative to an initial value of the second coordinate value of the second interpolation point.

In an implementation, the determining adjustment strength of a second coordinate value of the second interpolation point based on the first pixel quantity and the second pixel quantity includes: determining the adjustment strength of the second coordinate value of the second interpolation point according to the following equation:

$$TH\_strength = \begin{cases} TH\_strength1 + \Delta, NUM1 < NUM2 \\ TH\_strength1 + 2\Delta, 2NUM1 < NUM2 \end{cases}$$

Herein, TH_strength is the adjustment strength of the second coordinate value of the second interpolation point, TH_strength1 is a default value of the adjustment strength of the second coordinate value of the second interpolation point, $\Delta$ is an adjustment operation, NUM1 is the first pixel quantity, and NUM2 is the second pixel quantity.

In an implementation, the initial value of the second coordinate value of the second interpolation point is obtained according to the following equation:

$$VA21 = VA1 + \frac{(TH2 - TH1) \times (VA3 - VA1)}{TH3 - TH1}$$

Herein, VA21 is the initial value of the second coordinate value of the second interpolation point, VA1 is a second coordinate value of the first interpolation point, VA3 is a second coordinate value of the third interpolation point, TH2 is the first coordinate value of the second interpolation point, TH1 is the first coordinate value of the first interpolation point, and TH3 is the first coordinate value of the third interpolation point.

According to a third aspect, an image dynamic range processing method is provided. The method includes: receiving a function of a cubic spline curve and data information of a to-be-processed image that are sent by an encoder, where the data information of the to-be-processed image is used to obtain the to-be-processed image, and the function of the cubic spline curve is used to map a luminance value of a pixel whose luminance value is in a corresponding interval in the to-be-processed image to a target luminance value, to modify a dynamic range of the to-be-processed image; and modifying the dynamic range of the to-be-processed image based on the function of the cubic spline curve and the data information of the to-be-processed image.

According to a fourth aspect, an image dynamic range processing apparatus is provided. The apparatus includes: an obtaining module, configured to obtain a first coordinate value of a first interpolation point and a first coordinate value of a third interpolation point related to a first cubic spline curve, where the first coordinate value of the first interpolation point and the first coordinate value of the third interpolation point are luminance values; and a first determining module, configured to determine, based on histogram information of a first luminance interval of a to-be-processed image, a first coordinate value of a second interpolation point related to the first cubic spline curve. The first luminance interval is an interval between the first coordinate value of the first interpolation point and the first coordinate value of the third interpolation point. The first coordinate value of the first interpolation point, the first coordinate value of the second interpolation point, and the first coordinate value of the third interpolation point are used to determine a function of the first cubic spline curve. The function of the first cubic spline curve is used to map a luminance value of a pixel whose luminance value is in the first luminance interval in the to-be-processed image to a first target luminance value, to modify a dynamic range of the to-be-processed image.

In an implementation, the function of the first cubic spline curve is obtained in the following manner: The obtaining module is further configured to obtain a function of the basic mapping curve; and the first determining module is further configured to: map the first coordinate value of the first interpolation point and the first coordinate value of the third interpolation point based on the function of the basic mapping curve, to obtain a second coordinate value of the first interpolation point and a second coordinate value of the third interpolation point; determine a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point; and determine the function of the first cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

In an implementation, the first determining module is configured to determine the second coordinate value of the second interpolation point according to the following equation:

$$VA2 = VA1 + \frac{(TH2 - TH1) \times (VA3 - VA1)}{TH3 - TH1}$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point.

In an implementation, the apparatus further includes: a second determining module, configured to determine, based on the first coordinate value of the third interpolation point and a maximum RGB component value of a first pixel of the to-be-processed image, first coordinate values of a fourth interpolation point, a fifth interpolation point, and a sixth interpolation point related to a second cubic spline curve. The first pixel is a pixel with a largest maximum RGB component value in the to-be-processed image. The maximum RGB component value of the pixel is a largest value of an R component, a G component, and a B component of the pixel. The first coordinate value of the fourth interpolation point, the first coordinate value of the fifth interpolation point, and the first coordinate value of the sixth interpolation point are used to determine a function of the second cubic spline curve. The function of the second cubic spline curve is used to map a luminance value of a pixel whose luminance value is in a second luminance interval in the to-be-processed image to a second target luminance value, to modify the dynamic range of the to-be-processed image. The second luminance interval is an interval between the first coordinate value of the fourth interpolation point and the first coordinate value of the sixth interpolation point. The first luminance interval and the second luminance interval do not overlap.

In an implementation, the apparatus further includes: a sending module, configured to send the functions of the cubic spline curves and data information of the to-be-processed image to a decoder, so that the decoder modifies the dynamic range of the to-be-processed image based on the functions of the cubic spline curves. The data information of the to-be-processed image is used to obtain the to-be-processed image.

In an implementation, the obtaining module is configured to: set the first coordinate value of the first interpolation point to a first preset luminance value, and set the first coordinate value of the third interpolation point to a second preset luminance value.

In an implementation, the first coordinate value of the second interpolation point is determined according to the following equation:

$$TH2 = \frac{\sum_{i=0}^{N_{frame}}(i)}{N_{frame}}$$

Herein, TH2 is the first coordinate value of the second interpolation point, $N_{frame}$ is a total quantity of pixels whose luminance values are in the first luminance interval in the to-be-processed image, i is an $i^{th}$ pixel in the pixels whose luminance values are in the first luminance interval in the to-be-processed image, and f(i) is a luminance value of the $i^{th}$ pixel.

In an implementation, the second determining module is configured to: determine the first coordinate value of the fourth interpolation point according to a first equation, where the first equation is:

$$TH1\_high = TH3 + \frac{(MaxSource - TH3) \times (U - 2)}{U};$$

determine the first coordinate value of the fifth interpolation point according to a second equation, where the second equation is:

$$TH2\_high = TH3 + \frac{(MaxSource - TH3) \times (U - 1)}{U};$$

and set the first coordinate value of the sixth interpolation point to the maximum RGB component value of the first pixel.

Herein, TH1_high is the first coordinate value of the fourth interpolation point, TH2_high is the first coordinate value of the fifth interpolation point, a value of MaxSource is the maximum RGB component value of the first pixel, TH3 is the first coordinate value of the third interpolation point, and U is a preset value.

In an implementation, the second determining module is configured to determine the first coordinate values of the fourth interpolation point, the fifth interpolation point, and the sixth interpolation point in the following manner: determining an initial value of the first coordinate value of the fourth interpolation point based on the first coordinate value of the third interpolation point and the maximum RGB component value of the first pixel; setting the first coordinate value of the sixth interpolation point to the maximum RGB component value of the first pixel; determining a first pixel quantity and a second pixel quantity based on the initial value of the first coordinate value of the fourth interpolation point and the first coordinate value of the sixth interpolation point, where the first pixel quantity is a quantity of pixels whose luminance values are in a third luminance interval in the to-be-processed image, the third luminance interval is an interval between the initial value of the first coordinate value of the fourth interpolation point and the first coordinate value of the sixth interpolation point, and the second pixel quantity is a total quantity of pixels in the to-be-processed image or in a luminance histogram of the to-be-processed image; determining the first coordinate value of the fourth interpolation point based on the first pixel quantity, the second pixel quantity; the first coordinate value of the third interpolation point, the initial value of the first coordinate value of the fourth interpolation point, and the first coordinate value of the sixth interpolation point; and determining the first coordinate value of the fifth interpolation point based on histogram information of the second luminance interval of the to-be-processed image, the first coordinate value of the fourth interpolation point, and the first coordinate value of the sixth interpolation point.

In an implementation, the second luminance interval includes N subintervals, and N is a positive integer. The second determining module is configured to determine the first coordinate value of the fifth interpolation point in the following manner: determining an $i^{th}$ subinterval from the N subintervals, where the $i^{th}$ subinterval is in n subintervals of the N subintervals, a sequence number of the n subintervals is greater than or equal to N/4, the sequence number of the n subintervals is less than or equal to 3N/4, and a quantity of pixels whose luminance values are in the $i^{th}$ subinterval in the to-be-processed image is a smallest value in the n subintervals; and determining the first coordinate value of the fifth interpolation point based on the first coordinate value of the fourth interpolation point, the first coordinate value of the sixth interpolation point, and i.

In an implementation, a value of N is 8.

In an implementation, the second determining module is configured to determine the initial value of the first coordinate value of the fourth interpolation point according to the following equation:

$$TH1\_high = TH3 + \frac{(MaxSource - TH3) \times (U - 2)}{U}$$

Herein, TH1_high1 is the initial value of the first coordinate value of the fourth interpolation point, a value of MaxSource is the maximum RGB component value of the first pixel, U is a preset value, and THB is the first coordinate value of the third interpolation point.

In an implementation, the second determining module is configured to determine the first coordinate value of the fourth interpolation point in the following manner: determining a ratio of a length of the third luminance interval to the maximum RGB component value of the first pixel; and determining the first coordinate value of the fourth interpolation point according to the following equation:

$$\text{TH1\_high} = TH3 + \frac{(\text{MaxSource} - TH3) \times (U - 2)}{U} -$$
$$POW\left(\frac{\text{highRatio}}{\text{wholeratio}}, j\right) \times \frac{\text{MaxSource} - TH3}{U}$$

Herein, TH1_high is the first coordinate value of the fourth interpolation point, a value of MaxSource is the maximum RGB component value of the first pixel, U is a preset value, THB is the first coordinate value of the third interpolation point, highRatio is a ratio of the first pixel quantity to the second pixel quantity, $$\text{wholeratio} = \frac{\text{TH3\_high} - \text{TH1\_high1}}{\text{MaxSource}},$$

wholeratio is the ratio of the length of the third luminance interval to the maximum RGB component value of the first pixel, TH1_high1 is the initial value of the first coordinate value of the fourth interpolation point, TH3_high is the first coordinate value of the sixth interpolation point, and POW (x, j) indicates the $j^{th}$ power of x.

In an implementation, the second determining module is configured to determine the first coordinate value of the fifth interpolation point according to the following equation:

$$\text{TH2\_high} = \text{TH1\_high} +$$
$$(\text{TH3\_high} - \text{TH1\_high1}) \times \frac{\text{n\_min}}{N} + \frac{(\text{TH3\_high} - \text{TH1\_high})}{2N}$$

Herein, TH2_high is the first coordinate value of the fifth interpolation point, TH1_high is the first coordinate value of the fourth interpolation point, TH3_high is the first coordinate value of the sixth interpolation point, and n_min is i.

In an implementation, the apparatus further includes:

The second determining module is further configured to: determine a third pixel quantity and a fourth pixel quantity based on a luminance histogram of the to-be-processed image, the first coordinate value of the fourth interpolation point, the first coordinate value of the fifth interpolation point, and the first coordinate value of the sixth interpolation point, where the third pixel quantity is a quantity of pixels in an interval between the first coordinate value of the fourth interpolation point and the first coordinate value of the fifth interpolation point in the luminance histogram, and the fourth pixel quantity is a quantity of pixels in an interval between the first coordinate value of the fifth interpolation point and the first coordinate value of the sixth interpolation point in the luminance histogram; and determine adjustment strength of a second coordinate value of the fifth interpolation point based on the third pixel quantity and the fourth pixel quantity, where the adjustment strength indicates an offset degree of the second coordinate value of the fifth interpolation point relative to an initial value of the second coordinate value of the fifth interpolation point.

In an implementation, the second determining module is configured to determine the adjustment strength of the second coordinate value of the fifth interpolation point according to the following equation:

$$\text{TH\_high\_strength} = \begin{cases} \text{TH\_high\_strength1} + \Delta, & NUM1 < NUM2 \\ \text{TH\_high\_strength1} + 2\Delta, & 2NUM1 < NUM2 \end{cases}$$

Herein, TH_high_strength is the adjustment strength of the second coordinate value of the fifth interpolation point, TH_high_strength1 is a default value of the adjustment strength of the second coordinate value of the fifth interpolation point, A is an adjustment operation, NUM1 is the third pixel quantity, and NUM2 is the fourth pixel quantity.

In an implementation, the initial value of the second coordinate value of the fifth interpolation point is obtained according to the following equation:

$$\text{VA2\_high1} =$$
$$\text{VA1\_high} + \frac{(\text{TH2\_high} - \text{TH1\_high}) \times (\text{VA3\_high} - \text{VA1\_high})}{\text{TH3\_high} - \text{TH1\_high}}$$

Herein, VA2_high1 is the initial value of the second coordinate value of the fifth interpolation point, VA1_high is a second coordinate value of the fourth interpolation point, VA3_high is a second coordinate value of the sixth interpolation point, TH2_high is the first coordinate value of the fifth interpolation point, TH1_high is the first coordinate value of the fourth interpolation point, and TH3_high is the first coordinate value of the sixth interpolation point.

In an implementation, the function of the basic mapping curve is used to map a luminance value of a pixel in the to-be-processed image to a third target luminance value. The function of the basic mapping curve is a luminance mapping function in which the luminance value of the pixel in the to-be-processed image is an independent variable and the third target luminance value is a dependent variable. The luminance mapping function is expressed as follows:

$$L' = a \times \left(\frac{p \times L^n}{(p-1) \times L^a + 1}\right)^m + b$$

Parameters of the luminance mapping function include a, b, p, m, and n, L' is the third target luminance value, and L is the luminance value of the pixel in the to-be-processed image.

According to a fifth aspect, this application provides an image dynamic range processing apparatus, including:

an obtaining module, configured to obtain a maximum RGB component value of a first pixel of a to-be-processed image, where the first pixel is a pixel with a largest maximum RGB component value in the to-be-processed image, and the maximum RGB component value of the pixel is a largest value of an R component, a G component, and a B component of the pixel; and a first determining module, configured to determine, based on the maximum RGB component value of the first pixel and a luminance histogram of the to-be-processed image, a first coordinate value of an interpolation point related to at least one cubic spline curve. The interpolation point related to each cubic spline curve includes a first interpolation point, a second interpolation point, and a third interpolation point. The first coordinate value of the interpolation point is a luminance value. The first coordinate value of the interpolation point related to each cubic spline curve is used to determine a function of the corresponding cubic spline curve. The function of each cubic spline curve is used to map a luminance value of a pixel whose luminance value is in a corresponding first luminance interval in the to-be-processed image to a first target luminance value, to modify a dynamic range of the to-be-processed image. The first luminance interval corresponding to the function of the cubic spline curve is an interval between a first coordinate value of the first interpolation point and a first coordinate value of the third interpolation point related to the function of the cubic spline curve.

In an implementation, a quantity of the cubic spline curve is one.

The first determining module is further configured to: determine, based on the luminance histogram, a maximum RGB component value of a second pixel corresponding to a first percentage, a maximum RGB component value of a third pixel corresponding to a second percentage, and a maximum RGB component value of a fourth pixel corresponding to a third percentage, where the first percentage indicates a percentage of pixels whose maximum RGB component value is less than or equal to the maximum RGB component value of the second pixel in a plurality of pixels in the to-be-processed image, the second percentage indicates a percentage of pixels whose maximum RGB component value is less than or equal to the maximum RGB component value of the third pixel in the plurality of pixels in the to-be-processed image, and the third percentage indicates a percentage of pixels whose maximum RGB component value is less than or equal to the maximum RGB component value of the fourth pixel in the plurality of pixels in the to-be-processed image; determine the first coordinate value of the first interpolation point based on the maximum RGB component value of the second pixel corresponding to the first percentage, the maximum RGB component value of the third pixel corresponding to the second percentage, and the maximum RGB component value of the fourth pixel corresponding to the third percentage; set the first coordinate value of the third interpolation point to the maximum RGB component value of the first pixel; and determine a first coordinate value of the second interpolation point based on the first coordinate value of the first interpolation point, the first coordinate value of the third interpolation point, and histogram information corresponding to the first luminance interval in the luminance histogram.

In an implementation, the first determining module is configured to determine the first coordinate value of the first interpolation point in the following manner:

determining a first value of the first coordinate value of the first interpolation point based on the maximum RGB component value of the second pixel corresponding to the first percentage, the maximum RGB component value of the third pixel corresponding to the second percentage, and a luminance threshold; and determining the first coordinate value of the first interpolation point based on the maximum RGB component value of the second pixel corresponding to the first percentage, the maximum RGB component value of the third pixel corresponding to the second percentage, the maximum RGB component value of the fourth pixel corresponding to the third percentage, and the first value.

In an implementation, the first percentage is 90%, the second percentage is 95%, and the third percentage is 99%.

The determining module is configured to determine the first value of the first coordinate value of the first interpolation point according to the following equation:

$$TH1\_used1 = \frac{\left(g\_maxRGBdistribution90 + \frac{g\_maxRGBdistribution95 - g\_maxRGBdistribution90}{2.0}\right)}{THRESOLD}$$

Herein, TH1_used1 is the first value, g_maxRGBdistribution90 is the maximum RGB component value of the second pixel corresponding to 90%, g_maxRGBdistribution95 is the maximum RGB component value of the third pixel corresponding to 95%, and THRESOLD is the luminance threshold.

In an implementation, the first determining module is configured to determine the first coordinate value of the first interpolation point in the following manner: determining a difference between twice the maximum RGB component value of the third pixel corresponding to the second percentage and the maximum RGB component value of the second pixel corresponding to the first percentage; determining whether the maximum RGB component value of the fourth pixel corresponding to the third percentage is greater than a sum of the obtained difference and a first preset value, and whether the first value is greater than a first threshold; and if yes, setting the first coordinate value of the first interpolation point to the first value.

In an implementation, the first determining module is configured to determine the first coordinate value of the first interpolation point in the following manner: determining, based on the luminance histogram of the to-be-processed image, a maximum RGB component value of a fifth pixel corresponding to a fourth percentage, a maximum RGB component value of a sixth pixel corresponding to a fifth percentage, and a maximum RGB component value of a seventh pixel corresponding to a sixth percentage, where the fourth percentage indicates a percentage of pixels whose maximum RGB component value is less than or equal to the maximum RGB component value of the fifth pixel in a plurality of pixels in the to-be-processed image, the fifth percentage indicates a percentage of pixels whose maximum RGB component value is less than or equal to the maximum RGB component value of the sixth pixel in the plurality of pixels in the to-be-processed image, and the sixth percentage indicates a percentage of pixels whose maximum RGB component value is less than or equal to the maximum RGB component value of the seventh pixel in the plurality of pixels in the to-be-processed image; determining a first value of the first coordinate value of the first interpolation point based on the maximum RGB component value of the fifth pixel corresponding to the fourth percentage, the maximum RGB component value of the second pixel corresponding to the first percentage, and a luminance threshold; determining a second value of the first coordinate value of the first interpolation point based on the maximum RGB component value of the second pixel corresponding to the first percentage, the maximum RGB component value of the third pixel corresponding to the second percentage, and the luminance threshold; determining a third value of the first coordinate value of the first interpolation point based on the maximum RGB component value of the third pixel corresponding to the second percentage, the maximum RGB component value of the fourth pixel corresponding to the third percentage, and the luminance threshold; and determining the first coordinate value of the first interpolation point based on the maximum RGB component value of the fifth pixel corresponding to the fourth percentage, the maximum RGB component value of the sixth pixel corresponding to the fifth percentage, the maximum RGB component value of the second pixel corresponding to the first percentage, the maximum RGB component value of the third pixel corresponding to the second percentage, the maximum RGB component value of the fourth pixel corresponding to the third percentage, the maximum RGB component value of the seventh pixel corresponding to the sixth percentage, and the first value to the third value.

In an implementation, the first percentage is 90%, the second percentage is 95%, the third percentage is 99%, the fourth percentage is 50%, the fifth percentage is 10%, and the sixth percentage is 100%. The first determining module is configured to: determine the first value of the first coordinate value of the first interpolation point according to a first equation, where the first equation is:

$$TH1\_used1 = \frac{\left(g\_maxRGBdistribution50 + \frac{g\_maxRGBdistribution90 - g\_maxRGBdistribution50}{2.0}\right)}{THRESOLD};$$

determine the second value of the first coordinate value of the first interpolation point according to a second equation, where the second equation is:

$$TH1\_used2 = \frac{\left(g\_maxRGBdistribution90 + \frac{g\_maxRGBdistribution95 - g\_maxRGBdistribution90}{2.0}\right)}{THRESOLD};$$

and
determine the third value of the first coordinate value of the first interpolation point according to a third equation, where the third equation is:

$$TH1\_used3 = \frac{\left(g\_maxRGBdistribution95 + \frac{g\_maxRGBdistribution99 - g\_maxRGBdistribution95}{2.0}\right)}{THRESOLD}$$

Herein, $TH1\_used1$ is the first value, $TH1\_used2$ is the second value, $TH1\_used3$ is the third value, $g\_maxRGBdistribution90$ is the maximum RGB component value of the second pixel corresponding to 90%, $g\_maxRGBdistribution95$ is the maximum RGB component value of the third pixel corresponding to 95%, $g\_maxRGBdistribution50$ is the maximum RGB component value of the fifth pixel corresponding to 50%, $g\_maxRGBdistribution99$ is the maximum RGB component value of the fourth pixel corresponding to 99%, $g\_maxRGBdistribution10$ is the maximum RGB component value of the sixth pixel corresponding to 10%, and $THRESOLD$ is the luminance threshold.

In an implementation, the first determining module is configured to: determine an initial value of the first coordinate value of the first interpolation point according to a fourth equation:

$$TH1\_used = \begin{cases} TH1\_used1, & g\_maxRGBdistribution > g\_maxRGBdistribution50 - g\_maxRGBdistribution10 + g\_maxRGBdistribution + 100 \\ TH1\_used2, & g\_maxRGBdistribution99 > g\_maxRGBdistribution95 - g\_maxRGBdistribution + g\_maxRGBdistribution + 100 \\ TH1\_used3, & g\_maxRGBdistribution100 > \frac{g\_maxRGBdistribution99 - g\_maxRGBdistribution95}{4.0} + g\_maxRGBdistribution99 + 100 \end{cases};$$

and determine the first coordinate value of the first interpolation point based on the initial value of the first coordinate value of the first interpolation point, the second value, and the third value according to a fifth equation:

$$TH1 = \begin{cases} TH1\_used, & TH1\_used \geq 0.35 \\ TH1\_used2, & 0.35 > TH1\_used \text{ and } TH1\_used2 > 0.35 \\ TH1\_used3, & 0.35 > TH1\_used \text{ and } 0.35 > TH1\_used2 \text{ and } TH1\_used3 > 0.35 \end{cases}$$

Herein, TH1 is the first coordinate value of the first interpolation point, TH1_used is the initial value of the first coordinate value of the first interpolation point, TH1_used1 is the first value, TH1_used2 is the second value, TH1_used3 is the third value, g_maxRGBdistribution90 is the maximum RGB component value of the second pixel corresponding to 90%, g_maxRGBdistribution95 is the maximum RGB component value of the third pixel corresponding to 95%, g_maxRGBdistribution50 is the maximum RGB component value of the fifth pixel corresponding to 50%, g_maxRGBdistribution99 is the maximum RGB component value of the fourth pixel corresponding to 99%, g_maxRGBdistribution10 is the maximum RGB component value of the sixth pixel corresponding to 10%, and g_maxRGBdistribution100 is the maximum RGB component value of the seventh pixel corresponding to 100%.

In an implementation, the first luminance interval includes N subintervals, and N is a positive integer. The first determining module is configured to determine the first coordinate value of the second interpolation point in the following manner: determining an $i^{th}$ subinterval from the N subintervals, where the $i^{th}$ subinterval is in n subintervals of the N subintervals, a sequence number of the n subintervals is greater than or equal to N/4, the sequence number of the n subintervals is less than or equal to 3N/4, and a quantity of pixels whose luminance values are in the $i^{th}$ subinterval in the to-be-processed image is a smallest value in the n subintervals; and determining the first coordinate value of the second interpolation point based on the first coordinate value of the first interpolation point, the first coordinate value of the third interpolation point, and i.

In an implementation, a value of N is 8.

In an implementation, the first determining module is configured to determine the first coordinate value of the second interpolation point according to the following equation:

$$TH2 = TH1 + (TH3 - TH1) \times \frac{n\_min}{N} + \frac{(TH3 - TH1)}{2N}$$

Herein, TH2 is the first coordinate value of the second interpolation point, TH1 is the first coordinate value of the first interpolation point, TH3 is the first coordinate value of the third interpolation point, and n_min is i.

In an implementation, the function of the cubic spline curve is obtained in the following manner: The obtaining module is further configured to obtain a function of a basic mapping curve; and the first determining module is further configured to: map the first coordinate value of the first interpolation point and the first coordinate value of the third interpolation point based on the function of the basic mapping curve, to obtain a second coordinate value of the first interpolation point and a second coordinate value of the third interpolation point; determine a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point; and determine the function of the cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

In an implementation, the first determining module is configured to determine the second coordinate value of the second interpolation point according to the following equation:

$$VA2 = VA1 + \frac{(TH2 - TH1) \times (VA3 - VA1)}{TH3 - TH1}$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point.

In an implementation, the function of the basic mapping curve is used to map a luminance value of a pixel in the to-be-processed image to a second target luminance value. The function of the basic mapping curve is a luminance mapping function in which the luminance value of the pixel in the to-be-processed image is an independent variable and the second target luminance value is a dependent variable. The luminance mapping function is expressed as follows:

$$L' = a \times \left( \frac{p \times L^n}{(p-1) \times L^n + 1} \right)^m + b$$

Parameters of the luminance mapping function include a, b, p, m, and n, L' is the second target luminance value, and L is the luminance value of the pixel in the to-be-processed image.

In an implementation, the apparatus further includes: a second determining module, configured to: determine a first pixel quantity and a second pixel quantity based on the luminance histogram of the to-be-processed image, the first coordinate value of the first interpolation point, the first coordinate value of the second interpolation point, and the first coordinate value of the third interpolation point, where the first pixel quantity is a quantity of pixels in an interval between the first coordinate value of the first interpolation point and the first coordinate value of the second interpolation point in the luminance histogram, and the second pixel quantity is a quantity of pixels in an interval between the first coordinate value of the second interpolation point and the first coordinate value of the third interpolation point in the luminance histogram; and determine adjustment strength of a second coordinate value of the second interpolation point based on the first pixel quantity and the second pixel quantity, where the adjustment strength indicates an offset degree of the second coordinate value of the second interpolation point relative to an initial value of the second coordinate value of the second interpolation point.

In an implementation, the second determining module is configured to determine the adjustment strength of the second coordinate value of the second interpolation point according to the following equation:

$$TH\_strength = \begin{cases} TH\_strength1 + \Delta, NUM1 < NUM2 \\ TH\_strength1 + 2\Delta, 2NUM1 < NUM2 \end{cases}$$

Herein, TH_strength is the adjustment strength of the second coordinate value of the second interpolation point, TH_strength1 is a default value of the adjustment strength of the second coordinate value of the second interpolation point, 4 is an adjustment operation, NUM is the first pixel quantity, and NUM2 is the second pixel quantity.

In an implementation, the initial value of the second coordinate value of the second interpolation point is obtained according to the following equation:

$$VA21 = VA1 + \frac{(TH2 - TH1) \times (VA3 - VA1)}{TH3 - TH1}$$

Herein, VA21 is the initial value of the second coordinate value of the second interpolation point, VA1 is a second coordinate value of the first interpolation point, VA3 is a second coordinate value of the third interpolation point, TH2 is the first coordinate value of the second interpolation point, TH1 is the first coordinate value of the first interpolation point, and TH3 is the first coordinate value of the third interpolation point.

According to a sixth aspect, an image dynamic range processing apparatus is provided. The apparatus includes: a receiving module, configured to receive a function of a cubic spline curve and data information of a to-be-processed image that are sent by an encoder, where the data information of the to-be-processed image is used to obtain the to-be-processed image, and the function of the cubic spline curve is used to map a luminance value of a pixel whose luminance value is in a corresponding interval in the to-be-processed image to a target luminance value, to modify a dynamic range of the to-be-processed image; and a modification module, configured to modify the dynamic range of the to-be-processed image based on the function of the cubic spline curve and the data information of the to-be-processed image.

According to a seventh aspect, an image processing device is provided, including a processor and a memory. The processor is coupled to the memory. The processor is configured to enable the apparatus to perform the method according to any one of the first aspect to the third aspect.

According to an eighth aspect, a chip apparatus is provided, including an input interface, an output interface, at least one processor, and a memory. The input interface, the output interface, the processor, and the memory communicate with each other through an internal connection path. The processor is configured to execute code in the memory.

When the processor executes the code, the chip apparatus implements the method according to any one of the first aspect to the third aspect.

According to a ninth aspect, a computer-readable storage medium is provided, configured to store a computer program. The computer program is used to implement the method according to any one of the first aspect to the third aspect.

According to a tenth aspect, a computer program product is provided. The computer program product includes instructions. When the instructions are run on a computer, the computer is enabled to implement the method according to any one of the first aspect to the third aspect.

DESCRIPTION OF EMBODIMENTS

Figure 1:
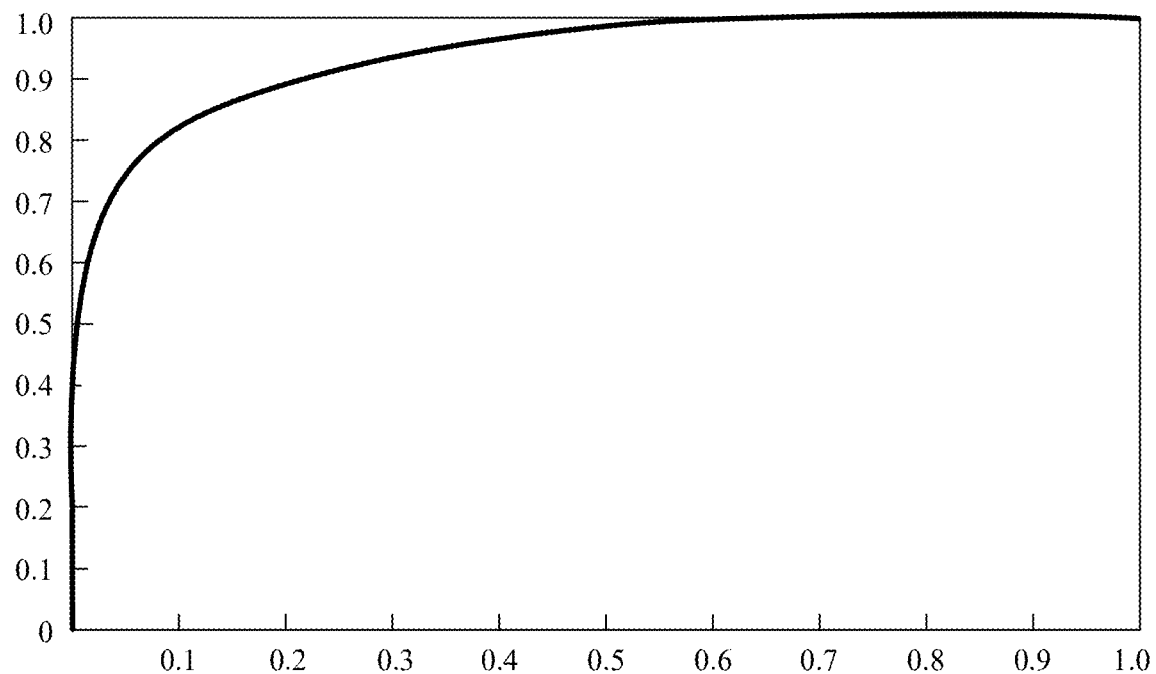
FIG. 1 is a diagram of a PQ optical-electro transfer function.

The following describes technical solutions of this application with reference to accompanying drawings.

First, related concepts and technologies in embodiments of this application are briefly described.

A dynamic range indicates a ratio of a maximum value to a minimum value of a variable in many fields. For a digital image, a dynamic range indicates a ratio of maximum luminance to minimum luminance in a range in which the image can be displayed. A dynamic range in nature is quite large. For example, luminance of a night scene in the starry sky is about 0.001 cd/m$^2$, and luminance of the sun is up to 1,000,000,000 cd/m$^2$. Herein, cd/m$^2$ (Candela per square meter) is the derived unit of luminance in the international system of units. Therefore, the dynamic range in nature reaches an order of magnitude of $1,000,000,000/0.001=10^{13}$.

However, in nature, the luminance of the sun and the luminance of a star are not obtained at the same time. For a natural scene in the real world, a dynamic range is from $10^{-3}$ to 106. This dynamic range is quite large, and therefore is usually referred to as a high dynamic range (HDR). Compared with the high dynamic range, a dynamic range for a common image is referred to as a low dynamic range (LDR). Therefore, it may be understood that an imaging process of a digital camera is actually a mapping process from a high dynamic range for the real world to a low dynamic range for a photo.

A larger dynamic range of an image indicates more scene details and richer light levels that are shown by the image and a more vivid visual effect. For a conventional digital image, one pixel value is generally stored by using one-byte (namely, 8-bit) space. For a high dynamic range image, one pixel value is stored by using a plurality of bytes of a floating point number, and therefore a high dynamic range for a natural scene can be represented.

In an optical digital imaging process (for example, an imaging process of a digital camera), optical radiation in a real scene is converted into an electrical signal by using an image sensor, and the electrical signal is stored in a form of a digital image. Image display aims to reproduce, by using a display device, a real scene described by a digital image. An ultimate objective of the optical digital imaging process and the image display is to enable a user to obtain visual perception the same as that obtained when the user directly observes the real scene.

Luminance levels that can be demonstrated by optical radiation (optical signals) for the real scene are almost linear. Therefore, the optical signal is also referred to as a linear signal. However, in a process of converting an optical signal into an electrical signal in optical digital imaging, not every optical signal corresponds to one electrical signal. In addition, an electrical signal obtained through conversion is nonlinear. Therefore, the electrical signal is also referred to as a nonlinear signal.

An optical-electro transfer function (OETF) indicates a conversion relationship between a linear signal of an image pixel and a nonlinear signal. Currently, commonly used optical-electro transfer functions include the following three types:

a perceptual quantizer (PQ) optical-electro transfer function, a hybrid log-gamma (HLG) optical-electro transfer function, and a scene luminance fidelity (SLF) optical-electro transfer function. The three optical-electro transfer functions are specified in the Audio Video Coding Standard (AVS).

The PQ optical-electro transfer function is a perceptual quantizer optical-electro transfer function provided based on a luminance perception model for human eyes. FIG. 1 is a diagram of a PQ optical-electro transfer function.

The PQ optical-electro transfer function indicates a conversion relationship between a linear signal value of an image pixel and a nonlinear signal value in a PQ domain, and the PQ optical-electro transfer function may be expressed as Equation (1):

$$\begin{cases} R' = \text{PQ\_TF}(\max(0, \min(R/10000, 1))) \\ G' = \text{PQ\_TF}(\max(0, \min(R/10000, 1))) \\ B' = \text{PQ\_TF}(\max(0, \min(R/10000, 1))) \end{cases} \quad (1)$$

Each parameter in Equation (1) is calculated as follows:

$$L' = \text{PQ\_TF}(L) = \left(\frac{c_1 + c_2 L^{m_1}}{1 + c_3 L^{m_1}}\right)^{m_2}.$$

Herein, L indicates a linear signal value with a value normalized to [0, 1], L' indicates a nonlinear signal value with a value range of [0, 1], $m_1$, $m_2$, $c_1$, $c_2$, and $c_3$ are PQ optical-electro transfer coefficients, $$m_1 = \frac{2610}{4096} \times \frac{1}{4} = 0.1593017578125,$$

$$m_2 = \frac{2523}{4096} \times 128 = 78.84375,$$

$$c_1 = c_3 - c_2 + 1 = \frac{3424}{4096} = 0.8359375,$$

$$c_2 = \frac{2413}{4096} \times 32 = 18.8515625, \text{ and}$$

$$c_3 = \frac{2392}{4096} \times 32 = 18.6875.$$

Figure 2:
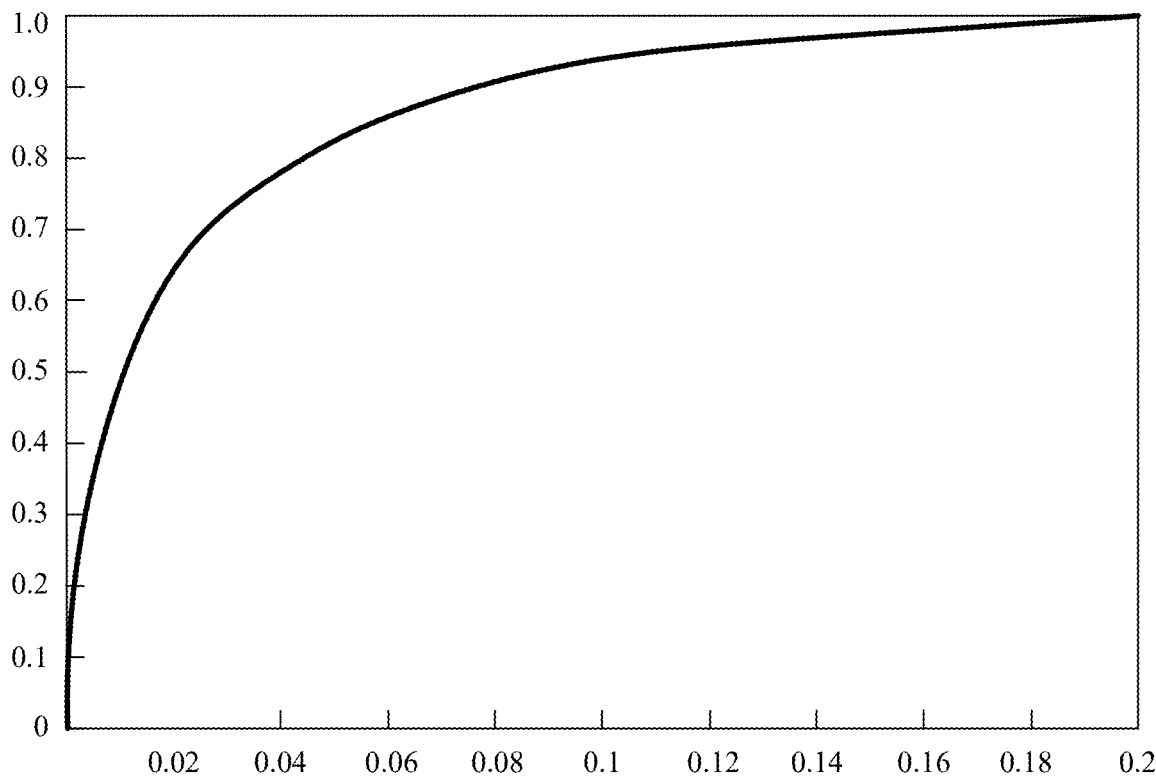
FIG. 2 is a diagram of an HLG optical-electro transfer function.

The HLG optical-electro transfer function is obtained by improving a conventional gamma curve. FIG. 2 is a diagram of an HLG optical-electro transfer function.

For the HLG optical-electro transfer function, the conventional gamma curve is used in the lower half region, and a log curve is added to the upper half region. The HLG optical-electro transfer function indicates a conversion relationship between a linear signal value of an image pixel and a nonlinear signal value in an HLG domain, and the HLG optical-electro transfer function may be expressed as Equation (2):

$$L' = \text{HLG\_TF}(L) = \begin{cases} \sqrt{L}/2, & 0 \le L \le 1 \\ a\ln(L-b) + c, & 1 < L \end{cases} \quad (2)$$

Herein, L indicates a linear signal value with a value range of [0, 12], L' indicates a nonlinear signal value with a value range of [0, 1], a, b, and c are HLG optical-electro transfer coefficients, a=0.17883277, b=0.28466892, and c=0.55991073.

Figure 3:
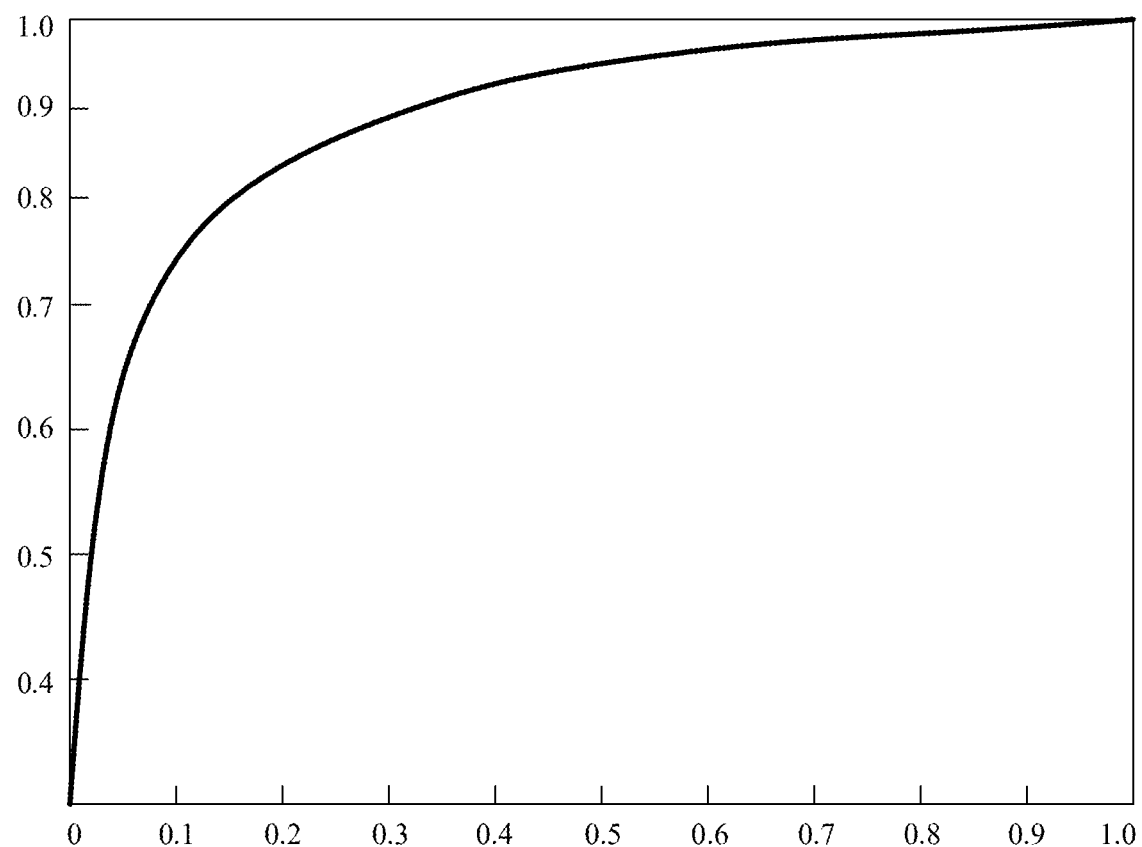
FIG. 3 is a diagram of an SLF optical-electro transfer function.

The SLF optical-electro transfer function is an optimal curve obtained based on luminance distribution in an HDR scene when optical characteristics of human eyes are satisfied. FIG. 3 is a diagram of an SLF optical-electro transfer function.

An SLF optical-electro transfer curve indicates a conversion relationship between a linear signal value of an image pixel and a nonlinear signal value in an SLF domain. The conversion relationship between a linear signal value of an image pixel and a nonlinear signal value in an SLF domain is expressed as Equation (3):

$$\begin{cases} R' = \text{SLF\_TF}(\max(0, \min(R/10000, 1))) \\ G' = \text{SLF\_TF}(\max(0, \min(R/10000, 1))) \\ B' = \text{SLF\_TF}(\max(0, \min(R/10000, 1))) \end{cases} \quad (3)$$

The SLF optical-electro transfer function may be expressed as Equation (4):

$$L' = \text{SLF\_TF}(L) = a \times \left(\frac{p \times L}{(p-1) \times L}\right)^m + b \quad (4)$$

Herein, L indicates a linear signal value with a value normalized to [0, 1], L' indicates a nonlinear signal value with a value range of [0, 1], p, m, a, and b are SLF optical-electro transfer coefficients, p=2.3, m=0.14, a=1.12762, and b=−0.12762.

Different display devices have different display capabilities. Therefore, generally depending on a display capability of a display device, a luminance value of each pixel in an image is mapped to a target luminance value based on a mapping curve, so that a dynamic range of the image is adjusted by changing the luminance value of the pixel. In other words, the dynamic range of the image is adjusted to a displayable dynamic range of the display device for display.

A dynamic range adjustment method is mainly applied to adaptation between a front-end illumination signal and a back-end terminal display device. For example, the illumination signal collected by the front end is 4000 nits, and the display capability of the back-end terminal display device (TV, iPad) is only 500 nits. Therefore, a process of mapping a 4000-nit signal to a 500-nit device is a mapping process from high to low: Alternatively, the illumination signal collected by the front end is 100 nits, and the display capability of the back-end terminal display device is 2000 nits. A process of better displaying a 100-nit signal on a 2000-nit device is another mapping process from low to high.

The dynamic range adjustment method may be classified into static and dynamic. The dynamic range adjustment static method is an overall mapping process by using single data based on same video content or same hard disk content. In other words, the mapping curve is usually the same, and each scene uses the same mapping curve. The dynamic range adjustment dynamic method is dynamic adjustment based on content of a specific region, each scene, or each frame. In other words, different mapping curve processing is performed based on the specific region, each scene, or each frame. When the dynamic range adjustment dynamic method is used, information of each frame and each scene needs to be carried.

In the dynamic range adjustment static method, static metadata needs to be transmitted to the back-end display device, and the static metadata is used to instruct the back-end display device to generate a mapping curve. Because the dynamic range adjustment static method uses a same mapping curve for same video content or same hard disk content, the static metadata remains unchanged for the same video content or the same hard disk content. In the dynamic range adjustment dynamic method, dynamic metadata needs to be transmitted to the back-end display device, and the dynamic metadata is used to instruct the back-end display device to generate a mapping curve. Because different mapping curve processing is performed for each scene or each frame in the dynamic range adjustment dynamic method, different dynamic metadata is required for performing different mapping curve processing for each scene or each frame.

It should be noted that, compared with the dynamic range adjustment static method, the dynamic range adjustment dynamic method performs different mapping curve processing for each scene or each frame, so that the dynamic range adjustment dynamic method may adapt to more diversified scenes, has better display adaptation effect, and therefore becomes a current mainstream option.

Figure 4:
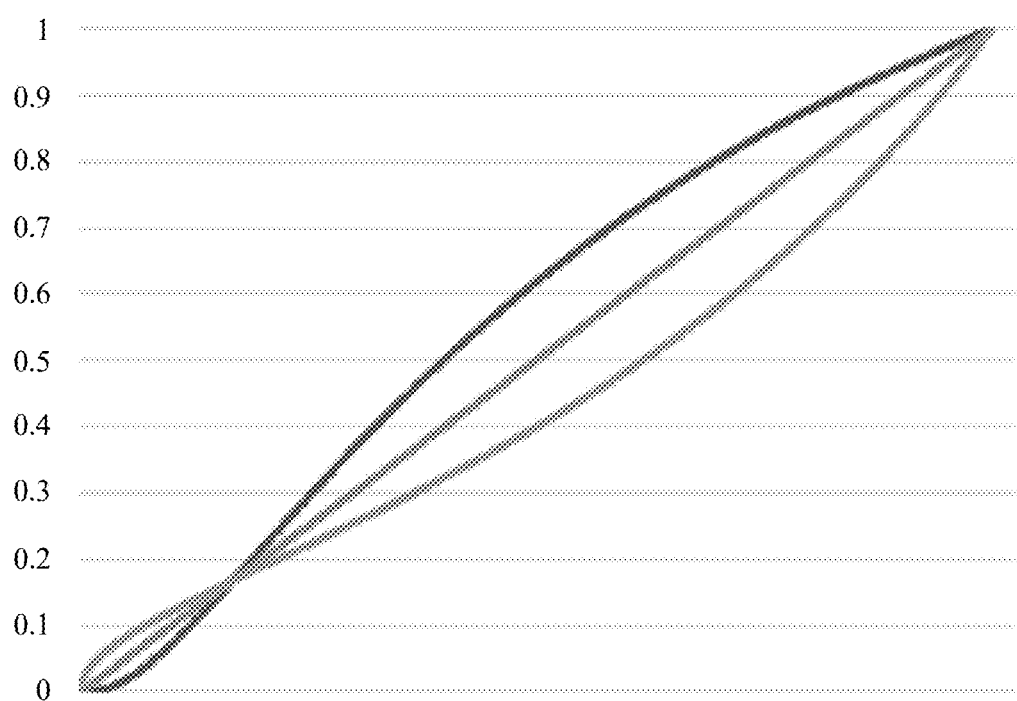
FIG. 4 is a schematic diagram of an existing mapping curve used in a dynamic range adjustment solution.

However, because a form of an existing mapping curve used in the dynamic range adjustment dynamic method is not flexible enough, luminance levels of some regions in the image are lost, and luminance contrast is not obvious. As a result, the image with the adjusted dynamic range has poor display effect. For example, FIG. 4 is a schematic diagram of an existing mapping curve used in a dynamic range adjustment dynamic solution. It may be seen from the figure that the form of the mapping curve includes only a C type, a reversed S type, and a reversed C type. If an image is in a scene with a strong contrast between brightness and darkness, a mapping curve of an S type is required. However, when a dynamic range of the image is adjusted based on the mapping curve in FIG. 4, the form of the mapping curve cannot be S type, after the image is dynamically mapped based on the mapping curve in FIG. 4, luminance levels of the image are lost, and luminance contrast is not obvious. As a result, the image with the adjusted dynamic range has poor display effect.

Therefore, this application provides an image dynamic range processing method. First coordinate values of a first interpolation point to a third interpolation point related to a cubic spline curve are determined. The first coordinate values of the interpolation points are luminance values. A function of the cubic spline curve is determined based on the first coordinate values of the first interpolation point to the third interpolation point. A luminance value of a pixel whose luminance value is in a first luminance interval in a to-be-processed image is mapped to a first target pixel value based on the function of the cubic spline curve, to modify a dynamic range of the to-be-processed image. The first luminance interval is an interval between the first coordinate value of the first interpolation point and the first coordinate value of the third interpolation point.

It is clear that when the luminance value of the pixel in the to-be-processed image is mapped based on a basic mapping curve, the luminance value of the pixel whose luminance value is in the first luminance interval in the to-be-processed image is mapped to the first target pixel value based on the function that is of the cubic spline curve and that is determined based on the first coordinate values of the first interpolation point to the third interpolation point. In other words, luminance mapping is performed on some pixels in the to-be-processed image based on the function of the cubic spline curve, and luminance mapping is performed, based on the basic mapping curve, on a pixel whose luminance value is located outside the first luminance interval in the to-be-processed image, so that an original mapping relationship of luminance values of some pixels in the to-be-processed image is changed, and a form of a curve segment corresponding to the first luminance interval on the basic mapping curve is changed. This improves diversity and flexibility of the form of the basic mapping curve and improves display effect of the image with the adjusted dynamic range.

Figure 5:
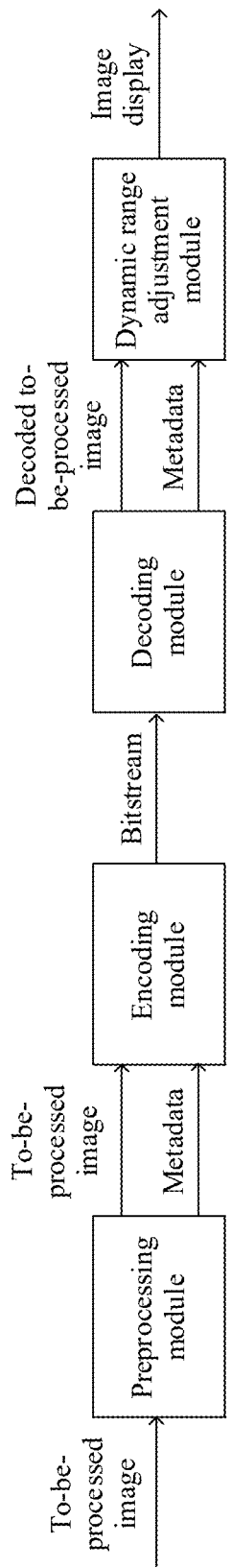
FIG. 5 is a schematic diagram of a structure of an end-to-end image dynamic range processing system according to an embodiment of this application.

FIG. 5 is a schematic diagram of a structure of an end-to-end image dynamic range processing system according to an embodiment of this application. As shown in FIG. 5, the system includes:

an encoder and a decoder, where the encoder includes a preprocessing module and an encoding module, and the decoder includes a decoding module and a dynamic range adjustment module.

Specifically, the preprocessing module is configured to receive a to-be-processed image and extract dynamic metadata from the to-be-processed image. The to-be-processed image may be a frame of image in a video, or may be an independent image. It should be noted that the dynamic metadata includes basic dynamic metadata and parameters of a function of a cubic spline curve, or the dynamic metadata includes basic dynamic metadata, parameters of a function of a basic mapping curve and parameters of a function of a cubic spline curve. If the to-be-processed image includes a plurality of pixels, the basic dynamic metadata extracted from the to-be-processed image includes maximun_maxrgb, average_maxrgb, variance_maxrgb, and minimum_maxrgb. maximun_maxrgb, indicates maximum luminance of displayed content. For example, maximun_maxrgb is a maximum RGB component value of a pixel with a largest maximum RGB component value in the plurality of pixels of the to-be-processed image. minimum_maxrgb indicates minimum luminance of the displayed content. For example, minimum_maxrgb is a maximum RGB component value of a pixel with a smallest maximum RGB component value in the plurality of pixels of the to-be-processed image. average_maxrgb indicates average luminance of the displayed content. For example, average_maxrgb is an average value of maximum RGB component values of the plurality of pixels of the to-be-processed image. variance_maxrgb indicates a luminance change range of the displayed content. For example, variance_maxrgb is a maximum RGB component value corresponding to 90% quantile of the maximum RGB component values of the plurality of pixels of the to-be-processed image and a maximum RGB component value corresponding to 10% quantile of the maximum RGB component values of the plurality of pixels of the to-be-processed image. The function of the cubic spline curve is used to map luminance values of pixels whose luminance values are in an independent variable value range of the function of the cubic spline curve in the to-be-processed image, and the function of the basic mapping curve is used to map luminance values of pixels whose luminance values are located outside the independent variable value range of the function of the cubic spline curve in the to-be-processed image, to adjust the dynamic range of the to-be-processed image.

The encoding module is configured to encode the dynamic metadata, embed the dynamic metadata into a bitstream, encode the to-be-processed image, and embed the to-be-processed image into the bitstream, so that the dynamic metadata and the to-be-processed image are sent to the decoder by using the bitstream.

The decoding module is configured to obtain the to-be-processed image and the dynamic metadata through decoding.

The dynamic range adjustment module is configured to: if the dynamic metadata includes the basic dynamic metadata and the parameters of the function of the cubic spline curve, calculate the parameters of the function of the basic mapping curve based on peak luminance of a display device and based on the to-be-processed image and the dynamic metadata that are obtained through decoding, construct the function of the basic mapping curve based on the parameters of the function of the basic mapping curve, construct the function of the cubic spline curve based on the parameters of the function of the cubic spline curve, adjust the dynamic range of the to-be-processed image based on the function of the basic mapping curve and the function of the cubic spline curve: or if the dynamic metadata includes the basic dynamic metadata, the parameters of the function of the basic mapping curve, and the parameters of the function of the cubic spline curve, construct the function of the basic mapping curve based on the parameters of the function of the basic mapping curve, construct the function of the cubic spline curve based on the parameters of the function of the cubic spline curve, and adjust the dynamic range of the to-be-processed image based on the function of the basic mapping curve and the function of the cubic spline curve without calculating the parameters of the function of the basic mapping curve. The encoder and the decoder may be, for example, a mobile phone display device, a set-top box, a television display device, or a network live broadcast or video application conversion device. This is not specially limited in this application. It should be noted that the schematic diagram of the structure of the end-to-end system in FIG. 5 is merely an example, and is not intended to limit this application.

According to a working principle of the system shown in FIG. 5, if the function of the cubic spline curve and the function of the basic mapping curve are determined, based on actions of the function of the cubic spline curve and the function of the basic mapping curve, it may be learned that when luminance mapping is performed on the to-be-processed image based on the function of the cubic spline curve and the function of the basic mapping curve, luminance values of some pixels are mapped based on the function of the cubic spline curve, and luminance values of some pixels are mapped based on the function of the basic mapping curve. Compared with an existing manner in which luminance values of all pixels are mapped simply based on a function of a basic mapping curve, this system maps luminance values of some pixels based on the function of the cubic spline curve. This means that an original mapping relationship of a curve segment on the basic mapping curve is changed. In other words, a form of a curve segment corresponding to the first luminance interval on the basic mapping curve is changed. This protects a specific region, improves diversity, flexibility, robustness, and universality of the form of the basic mapping curve, and further improves display effect of the image with the adjusted dynamic range.

Figure 6:
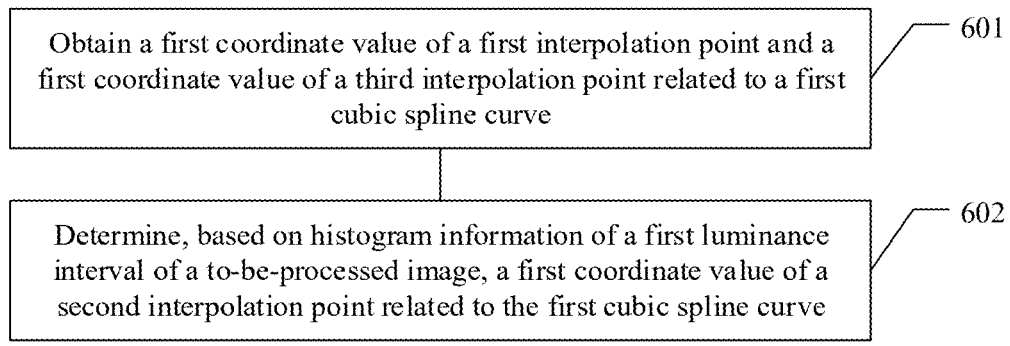
FIG. 6 is a first schematic flowchart of an image dynamic range processing method according to an embodiment of this application.

FIG. 6 is a first schematic flowchart of an image dynamic range processing method according to an embodiment of this application. The image dynamic range processing method is performed by, for example, the encoder in FIG. 5. This is not specially limited in this application. As shown in FIG. 6, the image dynamic range processing method includes the following operations.

Operation 601: Obtain a first coordinate value of a first interpolation point and a first coordinate value of a third interpolation point related to a first cubic spline curve, where the first coordinate value of the first interpolation point and the first coordinate value of the third interpolation point are luminance values.

Specifically, the first coordinate value of the first interpolation point is set to a first preset luminance value, and the first coordinate value of the third interpolation point is set to a second preset luminance value. The first preset luminance value may be, for example, a lower limit value of sensible luminance for human eyes, and the second preset luminance value may be, for example, a lower luminance limit value of a human skin tone. This is not specially limited in this embodiment of this application. For example, the first preset luminance value and the second preset luminance value may be further set based on an empirical value. For example, the first coordinate value of the first interpolation point is 0.15, and the first coordinate value of the third interpolation point is 0.35.

The luminance value herein may be a largest value of an R component, a G component, and a B component of a pixel, or may be an average value of the R component, the G component, and the B component of the pixel, or the like. This is not specially limited in this application.

Operation 602: Determine, based on histogram information of a first luminance interval of a to-be-processed image, a first coordinate value of a second interpolation point related to the first cubic spline curve, where the first luminance interval is an interval between the first coordinate value of the first interpolation point and the first coordinate value of the third interpolation point, the first coordinate value of the first interpolation point, the first coordinate value of the second interpolation point, and the first coordinate value of the third interpolation point are used to determine a function of the first cubic spline curve, and the function of the first cubic spline curve is used to map a luminance value of a pixel whose luminance value is in the first luminance interval in the to-be-processed image to a first target luminance value, to modify a dynamic range of the to-be-processed image.

Specifically, the first coordinate value of the second interpolation point may be determined according to the following equation:

$$TH2 = \frac{\sum_{i=0}^{N_{frame}} f(i)}{N_{frame}}$$

Herein, TH2 is the first coordinate value of the second interpolation point, $N_{frame}$ is a total quantity of pixels whose luminance values are in the first luminance interval in the to-be-processed image, i is an $i^{th}$ pixel in the pixels whose luminance values are in the first luminance interval in the to-be-processed image, and f(i) is a luminance value of the $i^{th}$ pixel.

The histogram information of the first luminance interval is a histogram of an interval that is in the luminance histogram of the to-be-processed image and that is located between the first coordinate value of the first interpolation point and the first coordinate value of the third interpolation point. A value of $N_{frame}$ is a total quantity of pixels included in the histogram information of the first luminance interval. A horizontal axis of the luminance histogram of the to-be-processed image indicates luminance of pixels in the to-be-processed image, and gradually transits from all black to all white from left to right. A vertical axis indicates a corresponding quantity of pixels in a luminance range in the to-be-processed image. It should be noted that when the luminance histogram of the to-be-processed image is constructed, the largest value of the R component, the G component, and the B component of the pixel may be used as the luminance value of the pixel, or the average value of the R component, the G component, and the B component of the pixel may be used as the luminance value of the pixel. This is not specially limited in this application.

In another embodiment of this application, the first coordinate value of the second interpolation point may alternatively be determined according to the following equation:

$$TH2 = \frac{\sum_{i=0}^{N_{frame}-1} f(i)}{N_{frame}}$$

Herein, TH2 is the first coordinate value of the second interpolation point, $N_{frame}$ is a total quantity of pixels whose luminance values are in the first luminance interval in the to-be-processed image, i is an $i^{th}$ pixel in the pixels whose luminance values are in the first luminance interval in the to-be-processed image, and f(i) is a luminance value of the $i^{th}$ pixel.

In another embodiment of this application, the first coordinate value of the second interpolation point may alternatively be set to an average value of the first coordinate value of the first interpolation point and the first coordinate value of the third interpolation point.

A process of obtaining the function of the first cubic spline curve includes the following four operations.

Operation 1: Obtain a function of a basic mapping curve. The function of the basic mapping curve is used to map a luminance value of a pixel in the to-be-processed image to a third target luminance value. The function of the basic mapping curve is a luminance mapping function in which the luminance value of the pixel in the to-be-processed image is an independent variable and the third target luminance value is a dependent variable. For example, the luminance mapping function is expressed as follows:

$$L' = a \times \left( \frac{p \times L^n}{(p-1) \times L^n + 1} \right)^m + b$$

Parameters of the luminance mapping function include a, b, p, m, and n, L' is the third target luminance value, and L is the luminance value of the pixel in the to-be-processed image.

It should be noted that the function of the basic mapping curve is merely an example, and is not intended to limit this application.

The luminance value indicated by the independent variable and the dependent variable of the function of the basic mapping function may be a largest value of an R component, a G component, and a B component of a pixel, or may be an average value of the R component, the G component, and the B component of the pixel, or the like. This is not specially limited in this application.

The obtaining a function of a basic mapping curve includes: obtaining a value of a parameter of the function of the basic mapping curve, and then constructing the basic mapping curve based on the value of the parameter of the function of the basic mapping curve.

The following describes a process of obtaining the function of the basic mapping curve by using an example in which the function of the basic mapping curve is the luminance mapping function.

First, m is set to 2.4, n is set to 1, and b is set to minimum luminance MinDisplay of a reference display device. The reference display device herein may be a display device that displays the to-be-processed image, or may be a display device assumed in current calculation.

A first value of p is calculated based on average_maxrgb (avgL) in the to-be-processed image according to the following equation:

$$p1 =$$

$$\begin{cases} PvalueHo, & avgL > TPH0 \\ PvalueHo \times g0() + PvalueLo \times (1 - g0(w0)), & avgL \geq TPL0, avgL \leq TPH0 \\ PvalueLo, & TPL0 > avgL \end{cases}$$

Herein, $$w0 = \left(\frac{avgL - TPL0}{TPH0 - TPL0}\right),$$

PvalueHo, PvalueLo, TPH0, and TPL0 are preset values. Default values are separately 3.5, 4, 0, 0.6, and 0.3. g0( ) is y=x$^N$, and is y=x by default. p1 is the first value of p.

Then, a value of p is determined based on a maximum luminance modification value max_lum of the to-be-processed image and p1. A specific process is as follows:

$$p = \begin{cases} p1 + PdeltaH1, \max\_lum > TPH1 \\ p1 + PdeltaH1 \times g1(w1) + PdeltaL1 \times (1 - g1(w1)), \\ \max\_lum \geq TPL1, avgL \leq TPH1 \\ p1 + PdeltaL1, TPL1 > \max\_lum \end{cases}$$

Herein, PdeltaHl, PdeltaLl, TPHI, and TPLI are preset values. Default values are separately 0.6, 0, 0.9, and 0.75. g1( ) is y=x$^N$, and is y=x by default.

Finally, H(L) is calculated based on b, p, m, n, K1, K2 and K3:

$$H(L) = \left(\frac{p \times L^n}{(K1 \times p - K2) \times L^n + K3}\right)^m$$

Herein, K1, K2, and K3 are preset values. Default values are all 1.

A calculation equation of a is as follows:

$a$=(MaxDisplay−MinDisplay)/($H$(MaxSource)−$H$(MinSource))

Herein, MaxDisplay is maximum luminance of the reference display device, MinDisplay is minimum luminance of the reference display device, MaxSource is the maximum luminance modification value max_lum of the to-be-processed image, and MinSource is a minimum luminance value of the to-be-processed image.

The following describes a process of determining the maximum luminance modification value max_lum of the to-be-processed image.

Specifically, max imun_maxrgb, average_maxrgb, and variance_maxrgb in the to-be-processed image are obtained. It should be noted that the three parameters have been described above. Therefore, details are not described herein again.

A first value of the maximum luminance correction value max_lum of the to-be-processed image is determined according to the following equation:

MAX=$B$×maximun_maxrgb+$A$×(2×average_maxrgb)+(1−$A$−$B$)×(2×variance_maxrgb)

Herein, MAX is the first value of the maximum luminance correction value max_lum, A and B are weight coefficients, $$A = (1 - B) \times \left(1 - F\left(\frac{\text{average\_maxrgb}}{\text{maximum\_maxrgb}}\right)\right),$$

and F( ) is a constant function.

The maximum luminance modification value max_lum of the to-be-processed image is determined based on the first value of max_lum according to the following equation:

$$\max\_lum = \begin{cases} MaxRefDisplay, \text{MAX} > MaxRefDisplay \\ \text{MAX}, \text{MAX} \geq \text{MIN} \,\&\&\, \text{MAX} \leq MaxRefDisplay \\ \text{MIN}, \text{MAX} < \text{MIN} \end{cases}$$

Herein, max_lum is the maximum luminance modification value, MaxRefDisplay is a maximum display luminance value of the display device, MIN is a preset minimum display luminance value, and MAX is the first value of the maximum luminance correction value max_lum.

Operation 2: Map the first coordinate value of the first interpolation point and the first coordinate value of the third interpolation point based on the function of the basic mapping curve, to obtain a second coordinate value of the first interpolation point and a second coordinate value of the third interpolation point.

Specifically, the first coordinate value of the first interpolation point is substituted as an independent variable into the function of the basic mapping curve, and an obtained value is determined as the second coordinate value of the first interpolation point. Similarly, the first coordinate value of the third interpolation point is substituted as an independent variable into the function of the basic mapping curve, and an obtained value is determined as the second coordinate value of the third interpolation point.

It should be noted that the foregoing manner of calculating the second coordinate value of the first interpolation point and the second coordinate value of the third interpolation point is merely an example, and is not intended to limit this application. For example, the second coordinate value of the first interpolation point may alternatively be determined based on the first coordinate value of the first interpolation point. It should be noted that regardless of the manner of calculating the second coordinate value of the first interpolation point, the calculated second coordinate value of the first interpolation point needs to be the same as the second coordinate value that is of the first interpolation point and that is obtained through substituting the first coordinate value of the first interpolation point into the function of the basic mapping curve.

Operation 3: Determine a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point.

Specifically, the second coordinate value of the second interpolation point may be determined in the following two manners.

In the first manner, the second coordinate value of the second interpolation point is determined according to the following equation:

$$VA2 = VA1 + \frac{(TH2 - TH1) \times (VA3 - VA1)}{TH3 - TH1}$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point.

In the second manner, the second coordinate value of the second interpolation point is determined according to the following equation:

$$VA2 = VA1 + \frac{(TH2 - TH1) \times (VA3 - VA1)}{TH3 - TH1} + TH\_strength$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, TH3 is the first coordinate value of the third interpolation point, TH_strength is adjustment strength of the second coordinate value of the second interpolation point, and TH_strength indicates an offset degree of the second coordinate value of the second interpolation point relative to an initial value of the second coordinate value of the second interpolation point. A specific value of TH_strength may be set as required, or may be obtained through calculation. This is not specially limited herein. For example, TH_strength may be set to 0. A calculation equation of the initial value of the second coordinate value of the second interpolation point is:

$$VA1 + \frac{(TH2 - TH1) \times (VA3 - VA1)}{TH3 - TH1}.$$

It should be noted that a manner of determining the second coordinate value of the second interpolation point herein is merely an example, and is not intended to limit this application.

Operation 4: Determine the function of the first cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

The first cubic spline curve includes two curve segments. Therefore, the function of the first cubic spline curve also includes two piecewise functions. The two piecewise functions one-to-one correspond to the curve segments.

For example, the function of the first cubic spline curve includes two piecewise functions as follows:

$F(L) = MD[1] \times (L-TH1)^3 + MC[1] \times (L-TH1)^2 + MB[1] \times (L-TH1)^1 + MA[1]$ Herein, L is a luminance value of a pixel whose luminance value is in an interval [TH1, TH2], and F(L) is first target luminance.

$F(L) = MD[2] \times (L-TH2)^3 + MC[2] \times (L-TH2)^2 + MB[2] \times (L-TH2)^1 + MA[2]$ Herein, L is a luminance value of a pixel whose luminance value is in an interval [TH2, TH3], F(L) is first target luminance, MD[1], MD[2], MC[1], MC[2], MB[1], MB[2], MA[1], and MA[2] are all parameters of the function of the first cubic spline curve.

A process of determining the function of the first cubic spline curve includes: calculating values of the parameters of the function of the first cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point, and then determining the function of the first cubic spline curve based on the values of the parameters of the function of the first cubic spline curve.

The following describes a process of determining a fourth interpolation point to a sixth interpolation point related to a second cubic spline curve. A detailed process is as follows:

First coordinate values of the fourth interpolation point, the fifth interpolation point, and the sixth interpolation point related to the second cubic spline curve are determined based on the first coordinate value of the third interpolation point and a maximum RGB component value of a first pixel of the to-be-processed image. The first pixel is a pixel with a largest maximum RGB component value in the to-be-processed image. The maximum RGB component value of the pixel is a largest value of an R component, a G component, and a B component of the pixel. The first coordinate value of the fourth interpolation point, the first coordinate value of the fifth interpolation point, and the first coordinate value of the sixth interpolation point are used to determine a function of the second cubic spline curve. The function of the second cubic spline curve is used to map a luminance value of a pixel whose luminance value is in a second luminance interval in the to-be-processed image to a second target luminance value, to modify the dynamic range of the to-be-processed image. The second luminance interval is an interval between the first coordinate value of the fourth interpolation point and the first coordinate value of the sixth interpolation point. The first luminance interval and the second luminance interval do not overlap. It should be noted that a value relationship between the first coordinate values of the first interpolation point to the sixth interpolation point may be: the first coordinate value of the first interpolation point<the first coordinate value of the second interpolation point<the first coordinate value of the third interpolation point<the first coordinate value of the fourth interpolation point<the first coordinate value of the fifth interpolation point<the first coordinate value of the sixth interpolation point.

In this embodiment of this application, the first coordinate values of the fourth interpolation point, the fifth interpolation point, and the sixth interpolation point may be determined in the following two manners.

Manner 1: The first coordinate value of the fourth interpolation point is determined according to a first equation, where the first equation is:

$$TH1\_high = TH3 + \frac{(MaxSource - TH3) \times (U - 2)}{U}$$

The first coordinate value of the fifth interpolation point is determined according to a second equation, where the second equation is:

$$TH2\_high = TH3 + \frac{(MaxSource - TH3) \times (U - 1)}{U}$$

The first coordinate value of the sixth interpolation point is set to the maximum RGB component value of the first pixel.

Herein, TH1_high is the first coordinate value of the fourth interpolation point, TH2_high is the first coordinate value of the fifth interpolation point, a value of MaxSource is the maximum RGB component value of the first pixel, TH3 is the first coordinate value of the third interpolation point, and U is a preset value. It should be noted that a value of U may be any positive integer greater than 2. This is not specially limited herein. For example, the value of U is 6.

Manner 2: Five operations are included.

Operation 1: Determine an initial value of the first coordinate value of the fourth interpolation point based on the first coordinate value of the third interpolation point and the maximum RGB component value of the first pixel.

The initial value of the first coordinate value of the fourth interpolation point may be determined according to the following equation:

$$TH1\_high1 = TH3 + \frac{(MaxSource - TH3) \times (U - 2)}{U}$$

Herein, TH1_high1 is the initial value of the first coordinate value of the fourth interpolation point, a value of MaxSource is the maximum RGB component value of the first pixel, U is a preset value, and TH3 is the first coordinate value of the third interpolation point. U has been described above. Therefore, details are not described herein again.

Operation 2: Set the first coordinate value of the sixth interpolation point to the maximum RGB component value of the first pixel.

Operation 3: Determine a first pixel quantity and a second pixel quantity based on the initial value of the first coordinate value of the fourth interpolation point and the first coordinate value of the sixth interpolation point, where the first pixel quantity is a quantity of pixels whose luminance values are in a third luminance interval in the to-be-processed image, the third luminance interval is an interval between the initial value of the first coordinate value of the fourth interpolation point and the first coordinate value of the sixth interpolation point, and the second pixel quantity is a total quantity of pixels in the to-be-processed image or in a luminance histogram of the to-be-processed image.

Operation 4: Determine the first coordinate value of the fourth interpolation point based on the first pixel quantity, the second pixel quantity, the first coordinate value of the third interpolation point, the initial value of the first coordinate value of the fourth interpolation point, and the first coordinate value of the sixth interpolation point.

Specifically, first a ratio of a length of the third luminance interval to the maximum RGB component value of the first pixel is determined.

Then, the first coordinate value of the fourth interpolation point is determined according to the following equation:

$$TH1\_high = TH3 + \frac{(MaxSource - TH3) \times (U - 2)}{U} - POW\left(\frac{highRatio}{wholeratio}, j\right) \times \frac{MaxSource - TH3}{U}$$

Herein, TH1_high is the first coordinate value of the fourth interpolation point, a value of MaxSource is the maximum RGB component value of the first pixel, U is a preset value, TH3 is the first coordinate value of the third interpolation point, highRatio is a ratio of the first pixel quantity to the second pixel quantity, $$wholeratio = \frac{TH3\_high - TH1\_high1}{MaxSource},$$

wholeratio is the ratio of the length of the third luminance interval to the maximum RGB component value of the first pixel, TH1_high1 is the initial value of the first coordinate value of the fourth interpolation point, TH3_high is the first coordinate value of the sixth interpolation point, POW(x, j) indicates the $j^{th}$ power of x, and a value of j may be 0.5.

Operation 5: Determine the first coordinate value of the fifth interpolation point based on histogram information of the second luminance interval of the to-be-processed image, the first coordinate value of the fourth interpolation point, and the first coordinate value of the sixth interpolation point.

In this embodiment of this application, the histogram information of the second luminance interval is a histogram of an interval that is in the luminance histogram of the to-be-processed image and that is located between the first coordinate value of the fourth interpolation point and the first coordinate value of the sixth interpolation point.

A process of determining the first coordinate value of the fifth interpolation point includes:

First, if the second luminance interval includes N subintervals, and N is a positive integer, for example, the second luminance interval may be divided at equal intervals to obtain the N subintervals, and an $i^{th}$ subinterval is determined from the N subintervals. The $i^{th}$ subinterval is in n subintervals of the N subintervals. A sequence number of the n subintervals is greater than or equal to N/4, and the sequence number of the n subintervals is less than or equal to 3N/4. A quantity of pixels whose luminance values are in the $i^{th}$ subinterval in the to-be-processed image is a smallest value in the n subintervals.

A value of N may be determined based on empirical data. A sequence number of a subinterval in the N subintervals may start from zero, or may start from 1. This is not specially limited herein. For example, if the value of N is 8, and the sequence number of the subinterval in the N subintervals starts from 1, sequence numbers of the n subintervals are separately 2, 3, 4, 5, and 6.

Then, the first coordinate value of the fifth interpolation point is determined based on the first coordinate value of the fourth interpolation point, the first coordinate value of the sixth interpolation point, and i. For example, the first coordinate value of the fifth interpolation point may be determined according to the following equation:

$$TH2\_high = TH1\_high + (TH3\_high - TH1\_high) \times \frac{n\_min}{N} + \frac{(TH3\_high - TH1\_high)}{2N}$$

Herein, TH2_high is the first coordinate value of the fifth interpolation point, TH1_high is the first coordinate value of the fourth interpolation point, TH3_high is the first coordinate value of the sixth interpolation point, and n_min is i.

A process of obtaining the function of the second cubic spline curve includes the following four operations.

Operation 1: Obtain a function of a basic mapping curve. A principle of the process has been described above. Therefore, details are not described herein again.

Operation 2: Map the first coordinate value of the fourth interpolation point and the first coordinate value of the sixth interpolation point based on the function of the basic mapping curve, to obtain a second coordinate value of the fourth interpolation point and a second coordinate value of the sixth interpolation point.

Specifically, a process of determining the second coordinate value of the fourth interpolation point and the second coordinate value of the sixth interpolation point is:

The first coordinate value of the fourth interpolation point is substituted as an independent variable into the function of the basic mapping curve, and an obtained value is determined as the second coordinate value of the fourth interpolation point. Similarly, the first coordinate value of the sixth interpolation point is substituted as an independent variable into the function of the basic mapping curve, and an obtained value is determined as the second coordinate value of the sixth interpolation point.

It should be noted that the foregoing manner of calculating the second coordinate value of the fourth interpolation point and the second coordinate value of the sixth interpolation point is merely an example, and is not intended to limit this application.

Operation 3: Determine a second coordinate value of the fifth interpolation point based on the first coordinate value of the fourth interpolation point, the first coordinate value of the fifth interpolation point, the first coordinate value of the sixth interpolation point, the second coordinate value of the fourth interpolation point, and the second coordinate value of the sixth interpolation point.

Specifically, the second coordinate value of the fifth interpolation point may be determined in the following two manners.

In the first manner, the second coordinate value of the fifth interpolation point is determined according to the following equation:

$$VA2\_high = VA1\_high + \frac{(TH2\_high - TH1\_high) \times (VA3\_high - VA1\_high)}{TH3\_high - TH1\_high}$$

Herein, VA2_high is the second coordinate value of the fifth interpolation point, VA1_high is a second coordinate value of the fourth interpolation point, VA3_high is a second coordinate value of the sixth interpolation point, TH2_high is the first coordinate value of the fifth interpolation point, TH1_high is the first coordinate value of the fourth interpolation point, and TH3_high is the first coordinate value of the sixth interpolation point.

In the second manner, the second coordinate value of the fifth interpolation point is determined according to the following equation:

$$VA2\_high = VA1\_high + \frac{(TH2\_high - TH1\_high) \times (VA3\_high - VA1\_high)}{TH3\_high - TH1\_high} + TH\_strength\_high$$

Herein, VA2_high is the second coordinate value of the fifth interpolation point, VA1_high is the second coordinate value of the fourth interpolation point, VA3_high is the second coordinate value of the sixth interpolation point, TH2_high is the first coordinate value of the fifth interpolation point, TH1_high is the first coordinate value of the fourth interpolation point, TH3_high is the first coordinate value of the sixth interpolation point, TH_strength_high is adjustment strength of the second coordinate value of the fifth interpolation point, and TH_strength_high indicates an offset degree of the second coordinate value of the fifth interpolation point relative to an initial value of the second coordinate value of the fifth interpolation point. A specific value of TH_strength_high may be set as required, or may be obtained through calculation. This is not specially limited herein. For example, TH_strength_high may be set to 0. A calculation equation of the initial value of the second coordinate value of the fifth interpolation point is:

$$VA2\_high1 = VA1\_high + \frac{(TH2\_high - TH1\_high) \times (VA3\_high - VA1\_high)}{TH3\_high - TH1\_high}.$$

VA2_high1 is the initial value of the second coordinate value of the fifth interpolation point.

It should be noted that a manner of determining the second coordinate value of the fifth interpolation point herein is merely an example, and is not intended to limit this application.

Operation 4: Determine the function of the second cubic spline curve based on the first coordinate value of the fourth interpolation point, the first coordinate value of the fifth interpolation point, the first coordinate value of the sixth interpolation point, the second coordinate value of the fourth interpolation point, the second coordinate value of the fifth interpolation point, and the second coordinate of the sixth interpolation point.

The second cubic spline curve includes two curve segments. Therefore, the function of the second cubic spline curve also includes two piecewise functions. The two piecewise functions one-to-one correspond to the curve segments.

It should be noted that a construction principle of the two piecewise functions included in the function of the second cubic spline curve herein is the same as a construction principle of the two piecewise functions included in the function of the first cubic spline curve in the foregoing descriptions. Therefore, details are not described herein again.

In view of this, a manner of determining the adjustment strength of the second coordinate value of the fifth interpolation point is as follows:

First, a third pixel quantity and a fourth pixel quantity are determined based on the luminance histogram of the to-be-processed image, the first coordinate value of the fourth interpolation point, the first coordinate value of the fifth interpolation point, and the first coordinate value of the sixth interpolation point. The third pixel quantity is a quantity of pixels in an interval between the first coordinate value of the fourth interpolation point and the first coordinate value of the fifth interpolation point in the luminance histogram. The fourth pixel quantity is a quantity of pixels in an interval between the first coordinate value of the fifth interpolation point and the first coordinate value of the sixth interpolation point in the luminance histogram.

Then, the adjustment strength of the second coordinate value of the fifth interpolation point is determined based on the third pixel quantity and the fourth pixel quantity. The adjustment strength indicates an offset degree of the second coordinate value of the fifth interpolation point relative to the initial value of the second coordinate value of the fifth interpolation point. Specifically, the adjustment strength of the second coordinate value of the fifth interpolation point may be determined according to the following equation:

$$\text{TH\_high\_strength} = \begin{cases} \text{TH\_high\_strength1} + \Delta, & NUM1 < NUM2 \\ \text{TH\_high\_strength1} + 2\Delta, & 2NUM1 < NUM2 \end{cases}$$

Herein, TH_high_strength is the adjustment strength of the second coordinate value of the fifth interpolation point, TH_high_strength1 is a default value of the adjustment strength of the second coordinate value of the fifth interpolation point, 4 is an adjustment operation, NUM1 is the third pixel quantity, and NUM2 is the fourth pixel quantity. A value of the adjustment operation may be set based on an empirical value, and may be a positive number, or may be a negative number, or may be zero. This is not specially limited in this application. For example, the adjustment operation is 0.2.

After obtaining the function of the first cubic spline curve and the function of the second cubic spline curve, the encoder may send the function of the first cubic spline curve, the function of the second cubic spline curve, and data information of the to-be-processed image to the decoder. Specifically, the function of the first cubic spline curve, the function of the second cubic spline curve, and the data information of the to-be-processed image may be encoded and then sent to the decoder by using the bitstream. It should be noted that the encoded function of the first cubic spline curve herein is a value of a parameter of the function of the first cubic spline curve. Similarly, the encoded function of the second cubic spline curve herein is a value of a parameter of the function of the second cubic spline curve. The data information of the to-be-processed image may be understood as a data representation manner of the to-be-processed image.

The decoder receives the function of the first cubic spline curve, the function of the second cubic spline curve, and the data information of the to-be-processed image that are sent by the encoder. The data information of the to-be-processed image is used to obtain the to-be-processed image. The function of the first cubic spline curve is used to map the luminance value of the pixel whose luminance value is in the first luminance interval in the to-be-processed image to the first target luminance value. The function of the second cubic spline curve is used to map the luminance value of the pixel whose luminance value is in the second luminance interval in the to-be-processed image to the second target luminance value. Specifically, the decoder decodes the bitstream sent by the encoder to obtain the function of the first cubic spline curve, the function of the second cubic spline curve, and the data information of the to-be-processed image.

The decoder maps the luminance value of the pixel whose luminance value is in the first luminance interval in the to-be-processed image to the first target luminance value based on the function of the first cubic spline curve, maps the luminance value of the pixel whose luminance value is in the second luminance interval in the to-be-processed image to the second target luminance value based on the function of the second cubic spline curve, and maps a luminance value of a pixel whose luminance value is located outside the first luminance interval and the second luminance interval in the to-be-processed image to the third target luminance value based on the function of the basic mapping curve, to modify and adjust the dynamic range of the to-be-processed image.

It should be noted that the parameter of the function of the basic mapping curve may be directly sent to the decoder after being obtained through calculation by the encoder. In this way, the decoder may directly generate the function of the basic mapping curve based on the parameter of the function of the basic mapping curve. The parameter of the function of the basic mapping curve may alternatively be obtained through calculation by the decoder. In this way, the encoder does not need to calculate the parameter of the function of the basic mapping curve. However, the encoder needs to send information such as basic dynamic metadata to the decoder, so that the decoder calculates the parameter of the function of the basic mapping curve based on the information such as the basic dynamic metadata.

Figure 7:
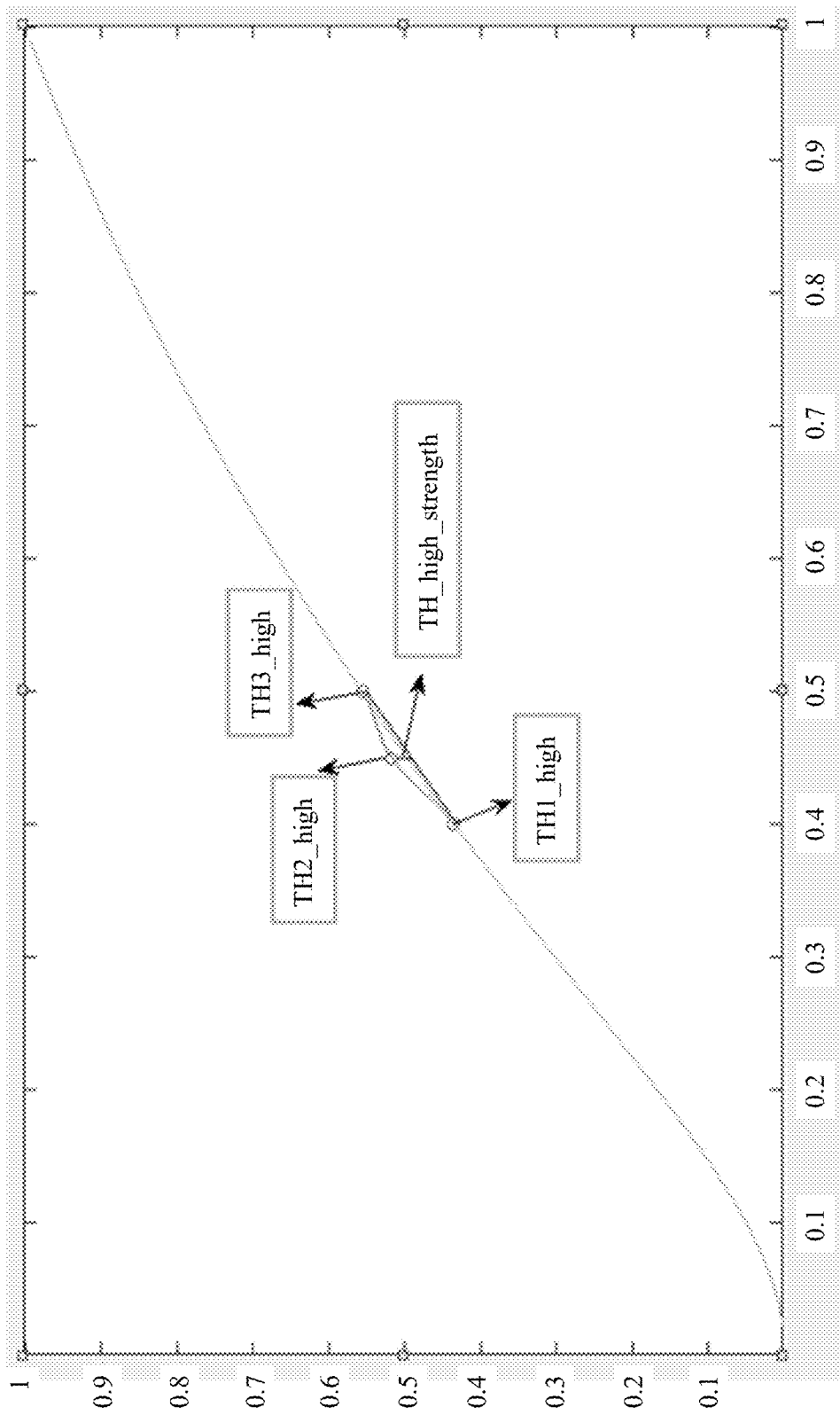
FIG. 7 is a schematic diagram of a second cubic spline curve and a basic mapping curve.

FIG. 7 is a schematic diagram of the second cubic spline curve and the basic mapping curve. It may be learned from FIG. 7 that a form of the basic mapping curve may be adjusted based on the second cubic spline curve, and a form of a curve segment corresponding to the second luminance interval on the basic mapping curve is changed. This improves diversity and flexibility of the form of the basic mapping curve.

In conclusion, the first coordinate value of the first interpolation point and the first coordinate value of the third interpolation point are obtained, the first coordinate value of the second interpolation point is determined based on the histogram information of the first luminance interval of the to-be-processed image, and the first coordinate values of the fourth interpolation point, the fifth interpolation point, and the sixth interpolation point related to the second cubic spline curve are determined based on the first coordinate value of the third interpolation point and the maximum RGB component value of the first pixel of the to-be-processed image. A manner of determining the interpolation point is simple and easy to implement. In addition, the first coordinate values of the first interpolation point to the third interpolation point related to the first cubic spline curve and the first coordinate values of the fourth interpolation point to the sixth interpolation point related to the second cubic spline curve are determined, the function of the first cubic spline curve is determined based on the first coordinate values of the first interpolation point to the third interpolation point, and the function of the second cubic spline curve is determined based on the first coordinate values of the fourth interpolation point to the sixth interpolation point. Therefore, the luminance value of pixel whose luminance value is in the first luminance interval in the to-be-processed image is mapped to the first target luminance value based on the function of the first cubic spline curve, and the luminance value of the pixel whose luminance value is in the second luminance interval in the to-be-processed image is mapped to the second target luminance value based on the function of the second cubic spline curve. In other words, the luminance values of some pixels in the to-be-processed image are mapped based on the function of the first cubic spline curve and the function of the second cubic spline curve, and the luminance values of remaining pixels are mapped based on the function of the basic mapping curve. This means that an original mapping relationship of a curve segment on the basic mapping curve is changed. In other words, a form of a curve segment corresponding to the first luminance interval and the second luminance interval on the basic mapping curve is changed. This protects a specific region, improves diversity; flexibility, robustness, and universality of the form of the basic mapping curve, and further improves display effect of the image with the adjusted dynamic range. In addition, because there are functions of two cubic spline curves, two regions may be protected at the same time. This further improves display effect of the image with the adjusted dynamic range.

Figure 8:
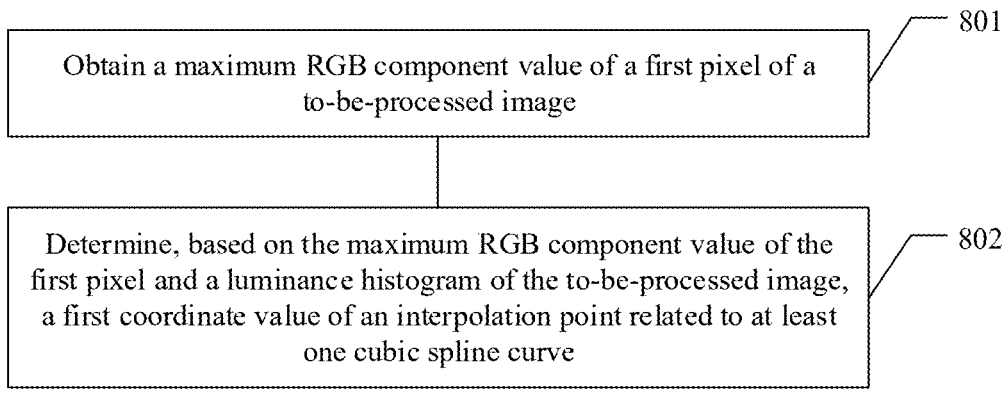
FIG. 8 is a second schematic flowchart of an image dynamic range processing method according to an embodiment of this application.

FIG. 8 is a second schematic flowchart of an image dynamic range processing method according to an embodiment of this application. The image dynamic range processing method is performed by, for example, the encoder in FIG. 5. This is not specially limited in this application. As shown in FIG. 8, the image dynamic range processing method includes the following operations.

Operation 801: Obtain a maximum RGB component value of a first pixel of a to-be-processed image, where the first pixel is a pixel with a largest maximum RGB component value in the to-be-processed image, and the maximum RGB component value of the pixel is a largest value of an R component, a G component, and a B component of the pixel.

Operation 802: Determine, based on the maximum RGB component value of the first pixel and a luminance histogram of the to-be-processed image, a first coordinate value of an interpolation point related to at least one cubic spline curve, where the interpolation point related to each cubic spline curve includes a first interpolation point, a second interpolation point, and a third interpolation point, the first coordinate value of the interpolation point is a luminance value, the first coordinate value of the interpolation point related to each cubic spline curve is used to determine a function of the corresponding cubic spline curve, the function of each cubic spline curve is used to map a luminance value of a pixel whose luminance value is in a corresponding first luminance interval in the to-be-processed image to a first target luminance value, to modify a dynamic range of the to-be-processed image, and the first luminance interval corresponding to the function of the cubic spline curve is an interval between a first coordinate value of the first interpolation point and a first coordinate value of the third interpolation point related to the function of the cubic spline curve.

A horizontal axis of the luminance histogram of the to-be-processed image indicates luminance of pixels in the to-be-processed image, and gradually transits from all black to all white from left to right. A vertical axis indicates a corresponding quantity of pixels in a luminance range in the to-be-processed image. It should be noted that when the luminance histogram of the to-be-processed image is constructed, the largest value of the R component, the G component, and the B component of the pixel may be used as the luminance value of the pixel, or the average value of the R component, the G component, and the B component of the pixel may be used as the luminance value of the pixel. This is not specially limited in this application.

The following describes operation 802 by using an example in which a quantity of the function of the cubic spline curve is one, and in other words, a quantity of the cubic spline curve is one. Specifically, the five operations may be included as follows:

Operation 1: Determine, based on the luminance histogram, a maximum RGB component value of a second pixel corresponding to a first percentage, a maximum RGB component value of a third pixel corresponding to a second percentage, and a maximum RGB component value of a fourth pixel corresponding to a third percentage, where the first percentage indicates a percentage of pixels whose maximum RGB component value is less than or equal to the maximum RGB component value of the second pixel in a plurality of pixels in the to-be-processed image, the second percentage indicates a percentage of pixels whose maximum RGB component value is less than or equal to the maximum RGB component value of the third pixel in the plurality of pixels in the to-be-processed image, and the third percentage indicates a percentage of pixels whose maximum RGB component value is less than or equal to the maximum RGB component value of the fourth pixel in the plurality of pixels in the to-be-processed image.

In this embodiment of this application, values of the first percentage, the second percentage, and the third percentage may be set based on empirical values. For example, the first percentage is 90%, the second percentage is 95%, and the third percentage is 99%. This is not specially limited in this application.

Operation 2: Determine the first coordinate value of the first interpolation point based on the maximum RGB component value of the second pixel corresponding to the first percentage, the maximum RGB component value of the third pixel corresponding to the second percentage, and the maximum RGB component value of the fourth pixel corresponding to the third percentage.

Operation 2 may be implemented in the following two manners.

In the first manner, a first value of the first coordinate value of the first interpolation point is determined based on the maximum RGB component value of the second pixel corresponding to the first percentage, the maximum RGB component value of the third pixel corresponding to the second percentage, and a luminance threshold. For example, if the first percentage is 90%, the second percentage is 95%, and the third percentage is 99%, the first value of the first coordinate value of the first interpolation point is determined according to the following equation:

$$TH1\_used1 = \frac{\left(g\_maxRGBdistribution90 + \frac{g\_maxRGBdistribution95 - g\_maxRGBdistribution90}{2.0}\right)}{THRESOLD}$$

Herein, TH1_used1 is the first value, g_maxRGBdistribution90 is the maximum RGB component value of the second pixel corresponding to 90%, g_maxRGBdistribution95 is the maximum RGB component value of the third pixel corresponding to 95%, and THRESOLD is the luminance threshold. The luminance threshold herein may be, for example, 1024. This is not specially limited in this application.

Then, the first coordinate value of the first interpolation point is determined based on the maximum RGB component value of the second pixel corresponding to the first percentage, the maximum RGB component value of the third pixel corresponding to the second percentage, and the first value of the maximum RGB component value of the fourth pixel corresponding to the third percentage.

Specifically, a difference between twice the maximum RGB component value of the third pixel corresponding to the second percentage and the maximum RGB component value of the second pixel corresponding to the first percentage is determined; whether the maximum RGB component value of the fourth pixel corresponding to the third percentage is greater than a sum of the obtained difference and a first preset value, and whether the first value is greater than a first threshold are determined; and if yes, the first coordinate value of the first interpolation point is set to the first value. The first preset value and the first threshold may be determined based on empirical data. This is not specially limited in this application. For example, the first preset value is 100, and the first threshold is 0.4.

It should be noted that if the maximum RGB component value of the fourth pixel corresponding to the third percentage is not greater than the sum of the obtained difference and the first preset value or the first value is not greater than the first threshold, the function of the cubic spline curve is not generated.

In the second manner, a maximum RGB component value of a fifth pixel corresponding to a fourth percentage, a maximum RGB component value of a sixth pixel corresponding to a fifth percentage, and a maximum RGB component value of a seventh pixel corresponding to a sixth percentage are determined based on the luminance histogram of the to-be-processed image. The fourth percentage indicates a percentage of pixels whose maximum RGB component value is less than or equal to the maximum RGB component value of the fifth pixel in a plurality of pixels in the to-be-processed image. The fifth percentage indicates a percentage of pixels whose maximum RGB component value is less than or equal to the maximum RGB component value of the sixth pixel in the plurality of pixels in the to-be-processed image. The sixth percentage indicates a percentage of pixels whose maximum RGB component value is less than or equal to the maximum RGB component value of the seventh pixel in the plurality of pixels in the to-be-processed image.

Then, a first value of the first coordinate value of the first interpolation point is determined based on the maximum RGB component value of the fifth pixel corresponding to the fourth percentage, the maximum RGB component value of the second pixel corresponding to the first percentage, and a luminance threshold.

After that, a second value of the first coordinate value of the first interpolation point is determined based on the maximum RGB component value of the second pixel corresponding to the first percentage, the maximum RGB component value of the third pixel corresponding to the second percentage, and the luminance threshold.

Then, a third value of the first coordinate value of the first interpolation point is determined based on the maximum RGB component value of the third pixel corresponding to the second percentage, the maximum RGB component value of the fourth pixel corresponding to the third percentage, and the luminance threshold.

Finally, the first coordinate value of the first interpolation point is determined based on the maximum RGB component value of the fifth pixel corresponding to the fourth percentage, the maximum RGB component value of the sixth pixel corresponding to the fifth percentage, the maximum RGB component value of the second pixel corresponding to the first percentage, the maximum RGB component value of the third pixel corresponding to the second percentage, the maximum RGB component value of the fourth pixel corresponding to the third percentage, the maximum RGB component value of the seventh pixel corresponding to the sixth percentage, and the first value to the third value.

The following describes a process of determining the first coordinate value of the first interpolation point in the second manner by using an example in which the first percentage is 90%, the second percentage is 95%, the third percentage is 99%, the fourth percentage is 50%, the fifth percentage is 10%, and the sixth percentage is 100%.

First, the first value of the first coordinate value of the first interpolation point is determined according to a first equation, where the first equation is:

$$TH1\_used1 = \frac{\left(g\_maxRGBdistribution50 + \frac{g\_maxRGBdistribution90 - g\_maxRGBdistribution50}{2.0}\right)}{THRESOLD}$$

The second value of the first coordinate value of the first interpolation point is determined according to a second equation, where the second equation is:

$$TH1\_used2 = \frac{\left(g\_maxRGBdistribution90 + \frac{g\_maxRGBdistribution95 - g\_maxRGBdistribution90}{2.0}\right)}{THRESOLD}$$

The third value of the first coordinate value of the first interpolation point is determined according to a third equation, where the third equation is:

$$TH1\_used3 = \frac{\left(g\_maxRGBdistribution95 + \frac{g\_maxRGBdistribution99 - g\_maxRGBdistribution95}{2.0}\right)}{THRESOLD}$$

Herein, TH1_used1 is the first value, TH1_used2 is the second value, TH1_used3 is the third value, g_maxRGBdistribution90 is the maximum RGB component value of the second pixel corresponding to 90%, g_maxRGBdistribution95 is the maximum RGB component value of the third pixel corresponding to 95%, g_maxRGBdistribution50 is the maximum RGB component value of the fifth pixel corresponding to 50%, g_maxRGBdistribution99 is the maximum RGB component value of the fourth pixel corresponding to 99%, g_maxRGBdistribution10 is the maximum RGB component value of the sixth pixel corresponding to 10%, and THRESOLD is the luminance threshold.

An initial value of the first coordinate value of the first interpolation point is determined according to a fourth equation:

$$TH1\_used = \begin{cases} TH1\_used1, & g\_maxRGBdistribution90 > g\_maxRGBdistribution50 - g\_maxRGBdistribution10 + g\_maxRGBdistribution50 + 100 \\ TH1\_used2, & g\_maxRGBdistribution99 > g\_maxRGBdistribution95 - g\_maxRGBdistribution90 + g\_maxRGBdistribution95 + 100 \\ TH1\_used3, & g\_maxRGBdistribution100 > \frac{g\_maxRGBdistribution99 - g\_maxRGBdistribution95}{4.0} + g\_maxRGBdistribution99 + 100 \end{cases}$$

The first coordinate value of the first interpolation point is determined based on the initial value of the first coordinate value of the first interpolation point, the second value, and the third value according to a fifth equation:

$$TH1 = \begin{cases} TH1\_used, & TH1\_used \geq 0.35 \\ TH1\_used2, & 0.35 > TH1\_used \text{ and } TH1\_used2 > 0.35 \\ TH1\_used3, & 0.35 > TH1\_used \text{ and } 0.35 \geq TH1\_used2 \text{ and } TH1\_used3 > 0.35 \end{cases}$$

Herein, TH1 is the first coordinate value of the first interpolation point, TH1_used is the initial value of the first coordinate value of the first interpolation point, TH1_used1 is the first value, TH1_used2 is the second value, TH1_used3 is the third value, g_maxRGBdistribution90 is the maximum RGB component value of the second pixel corresponding to 90%, g_maxRGBdistribution95 is the maximum RGB component value of the third pixel corresponding to 95%, g_maxRGBdistribution50 is the maximum RGB component value of the fifth pixel corresponding to 50%, g_maxRGBdistribution99 is the maximum RGB component value of the fourth pixel corresponding to 99%, g_maxRGBdistribution10 is the maximum RGB component value of the sixth pixel corresponding to 10%, and g_maxRGBdistribution100 is the maximum RGB component value of the seventh pixel corresponding to 100%.

It should be noted that a process of determining the first coordinate value of the first interpolation point based on the initial value of the first coordinate value of the first interpolation point, the second value, and the third value is: determining whether the initial value of the first coordinate value of the first interpolation point is greater than or equal to 0.35: if the initial value of the first coordinate value of the first interpolation point is greater than or equal to 0.35, setting the first coordinate value of the first interpolation point to the initial value of the first coordinate value of the first interpolation point: or if the initial value of the first coordinate value of the first interpolation point is less than 0.35, determining whether the second value is greater than 0.35, if the second value is greater than 0.35, setting the first coordinate value of the first interpolation point to the second value, or if the second value is not greater than 0.35, determining whether the third value is greater than 0.35, and if the third value is greater than 0.35, setting the first coordinate value of the first interpolation point to the third value, or if the third value is not greater than 0.35, skipping generating the function of the cubic spline curve.

Operation 3: Set the first coordinate value of the third interpolation point to the maximum RGB component value of the first pixel.

Operation 4: Determine a first coordinate value of the second interpolation point based on the first coordinate value of the first interpolation point, the first coordinate value of the third interpolation point, and histogram information corresponding to the first luminance interval in the luminance histogram.

In this embodiment of this application, the histogram information of the first luminance interval is a histogram of an interval that is in the luminance histogram of the to-be-processed image and that is located between the first coordinate value of the first interpolation point and the first coordinate value of the third interpolation point.

A process of determining the first coordinate value of the second interpolation point includes:

First, if the first luminance interval includes N subintervals, and N is a positive integer. An $i^{th}$ subinterval is determined from the N subintervals. The $i^{th}$ subinterval is in n subintervals of the N subintervals. A sequence number of the n subintervals is greater than or equal to N/4, and the sequence number of the n subintervals is less than or equal to 3N/4. A quantity of pixels whose luminance values are in the $i^{th}$ subinterval in the to-be-processed image is a smallest value in the n subintervals.

A value of N may be determined based on empirical data. For example, if the value of N is 8, sequence numbers of the n subintervals are separately 2, 3, 4, 5, and 6.

Then, the first coordinate value of the second interpolation point is determined based on the first coordinate value of the first interpolation point, the first coordinate value of the third interpolation point, and i. For example, the first coordinate value of the second interpolation point may be determined according to the following equation:

$$TH2 = TH1 + (TH3 - TH1) \times \frac{n\_min}{N} + \frac{(TH3 - TH1)}{2N}$$

Herein, TH2 is the first coordinate value of the second interpolation point, TH1 is the first coordinate value of the first interpolation point, THB is the first coordinate value of the third interpolation point, and n_min is i.

A process of obtaining the function of the cubic spline curve includes the following four operations.

Operation 1: Obtain a function of a basic mapping curve. The basic mapping curve has been described above. Therefore, details are not described again.

Operation 2: Map the first coordinate value of the first interpolation point and the first coordinate value of the third interpolation point based on the function of the basic mapping curve, to obtain a second coordinate value of the first interpolation point and a second coordinate value of the third interpolation point. A principle of the operations has been described above. Therefore, details are not described herein again.

Operation 3: Determine a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point.

For example, the second coordinate value of the second interpolation point is determined according to the following equation:

$$VA2 = VA1 + \frac{(TH2 - TH1) \times (VA3 - VA1)}{TH3 - TH1}$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point.

For another example, the second coordinate value of the second interpolation point is determined according to the following equation:

$$VA2 = VA1 + \frac{(TH2 - TH1) \times (VA3 - VA1)}{TH3 - TH1} + TH\_strength$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, TH3 is the first coordinate value of the third interpolation point, TH_strength is adjustment strength of the second coordinate value of the second interpolation point, and TH_strength indicates an offset degree of the second coordinate value of the second interpolation point relative to an initial value of the second coordinate value of the second interpolation point. A specific value of TH_strength may be set as required, or may be obtained through calculation. This is not specially limited herein. For example, TH_strength may be set to 0. A calculation equation of the initial value of the second coordinate value of the second interpolation point is:

$$VA21 = VA1 + \frac{(TH2 - TH1) \times (VA3 - VA1)}{TH3 - TH1}.$$

VA21 is the initial value of the second coordinate value of the second interpolation point.

It should be noted that a manner of determining the second coordinate value of the second interpolation point herein is merely an example, and is not intended to limit this application.

Operation 4: Determine the function of the cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

The cubic spline curve includes two curve segments. Therefore, the function of the cubic spline curve also includes two piecewise functions. The two piecewise functions one-to-one correspond to the curve segments.

It should be noted that a construction principle of the two piecewise functions included in the function of the cubic spline curve herein is the same as a construction principle of the two piecewise functions included in the function of the first cubic spline curve in the foregoing descriptions. Therefore, details are not described herein again.

In view of this, a manner of determining the adjustment strength of the second coordinate value of the second interpolation point is as follows:

First, a first pixel quantity and a second pixel quantity are determined based on the luminance histogram of the to-be-processed image, the first coordinate value of the first interpolation point, the first coordinate value of the second interpolation point, and the first coordinate value of the third interpolation point. The first pixel quantity is a quantity of pixels in an interval between the first coordinate value of the first interpolation point and the first coordinate value of the second interpolation point in the luminance histogram. The second pixel quantity is a quantity of pixels in an interval between the first coordinate value of the second interpolation point and the first coordinate value of the third interpolation point in the luminance histogram.

Then, the adjustment strength of the second coordinate value of the second interpolation point is determined based on the first pixel quantity and the second pixel quantity. The adjustment strength indicates an offset degree of the second coordinate value of the second interpolation point relative to the initial value of the second coordinate value of the second interpolation point. Specifically, the adjustment strength of the second coordinate value of the second interpolation point is determined according to the following equation:

$$TH\_strength = \begin{cases} TH\_strength1 + \Delta, NUM1 < NUM2 \\ TH\_strength1 + 2\Delta, 2NUM1 < NUM2 \end{cases}$$

Herein, TH1_strength is the adjustment strength of the second coordinate value of the second interpolation point, TH1_strength1 is a default value of the adjustment strength of the second coordinate value of the second interpolation point, 4 is an adjustment operation, NUM1 is the first pixel quantity, and NUM2 is the second pixel quantity. A value of the adjustment operation may be a positive number, a negative number, or 0.

After obtaining the function of the cubic spline curve, the encoder may send the function of the cubic spline curve and data information of the to-be-processed image to the decoder. Specifically, the function of the cubic spline curve and the data information of the to-be-processed image may be encoded and then sent to a decoder by using the bitstream. It should be noted that the encoded function of the cubic spline curve herein is a value of a parameter of the function of the cubic spline curve. The data information of the to-be-processed image may be understood as a data representation manner of the to-be-processed image.

The decoder receives the function of the cubic spline curve and the data information of the to-be-processed image that are sent by the encoder. The data information of the to-be-processed image is used to obtain the to-be-processed image. The function of the cubic spline curve is used to map the luminance value of the pixel whose luminance value is in the first luminance interval in the to-be-processed image to the first target luminance value. Specifically, the decoder decodes the bitstream sent by the encoder to obtain the function of the cubic spline curve and the data information of the to-be-processed image.

The decoder modifies the dynamic range of the to-be-processed image based on the function of the cubic spline curve and the data information of the to-be-processed image. In other words, the luminance value of the pixel whose luminance value is in the first luminance interval in the to-be-processed image is substituted into the function of the cubic spline curve, to obtain the first target luminance value of the corresponding pixel. It should be noted that a luminance value of a pixel whose luminance value is located outside the first luminance interval in the to-be-processed image is substituted into the function of the basic mapping curve to obtain a second target luminance value of the corresponding pixel, to adjust a dynamic range of the to-be-processed image.

It should be noted that the parameter of the function of the basic mapping curve may be directly sent to the decoder after being obtained through calculation by the encoder. In this way, the decoder may directly generate the function of the basic mapping curve based on the parameter of the function of the basic mapping curve. The parameter of the function of the basic mapping curve may alternatively be obtained through calculation by the decoder. In this way, the encoder does not need to calculate the parameter of the function of the basic mapping curve. However, the encoder needs to send information such as basic dynamic metadata to the decoder, so that the decoder calculates the parameter of the function of the basic mapping curve based on the information such as the basic dynamic metadata.

In conclusion, the first coordinate value of the second interpolation point may be determined by obtaining the first coordinate value of the first interpolation point and the first coordinate value of the third interpolation point and based on a histogram of the first luminance interval of the to-be-processed image. A manner of determining the interpolation point is simple and easy to implement. In addition, the function of the cubic spline curve is determined by determining the first coordinate values of the first interpolation point to the third interpolation point related to the cubic spline curve and based on the first coordinate values of the first interpolation point to the third interpolation point. Then, the luminance value of the pixel whose luminance value is in the first luminance interval of the to-be-processed image is mapped to the first target luminance value based on the function of the cubic spline curve. In other words, luminance values of some pixels in the to-be-processed image are mapped based on the function of the cubic spline curve, and luminance values of remaining pixels are mapped based on the function of the basic mapping curve. This means that an original mapping relationship of a curve segment on the basic mapping curve is changed. In other words, a form of a curve segment corresponding to the first luminance interval on the basic mapping curve is changed. This protects a specific region, improves diversity, flexibility, robustness, and universality of the form of the basic mapping curve, and further improves display effect of the image with the adjusted dynamic range.

It should be noted that the foregoing first coordinate values may be coordinate values on an X-axis, and the foregoing second coordinate values are coordinate values on a Y-axis, or the foregoing first coordinate values may be coordinate values on a Y-axis, and the foregoing second coordinate values are coordinate values on an X-axis. Data used in a calculation process and various types of data obtained from the to-be-processed image in this application are, for example, values of a PQ field. This is not specially limited in this embodiment of this application. It should be noted that the value of the PQ field is a value converted by using a PQ optical-electro transfer function.

Figure 9:
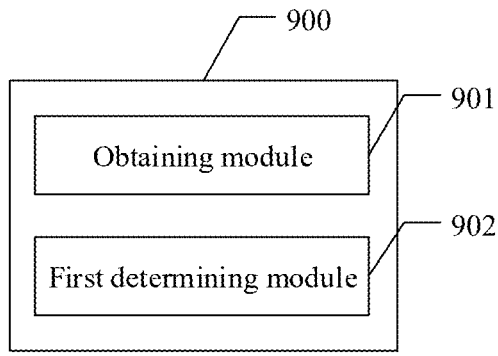
FIG. 9 is a first schematic diagram of a structure of an image dynamic range processing apparatus according to an embodiment of this application.

FIG. 9 is a first schematic diagram of a structure of an image dynamic range processing apparatus according to an embodiment of this application. The apparatus 900 includes:

an obtaining module 901, configured to obtain a first coordinate value of a first interpolation point and a first coordinate value of a third interpolation point related to a first cubic spline curve, where the first coordinate value of the first interpolation point and the first coordinate value of the third interpolation point are luminance values; and a first determining module 902, configured to determine, based on histogram information of a first luminance interval of a to-be-processed image, a first coordinate value of a second interpolation point related to the first cubic spline curve. The first luminance interval is an interval between the first coordinate value of the first interpolation point and the first coordinate value of the third interpolation point. The first coordinate value of the first interpolation point, the first coordinate value of the second interpolation point, and the first coordinate value of the third interpolation point are used to determine a function of the first cubic spline curve. The function of the first cubic spline curve is used to map a luminance value of a pixel whose luminance value is in the first luminance interval in the to-be-processed image to a first target luminance value, to modify a dynamic range of the to-be-processed image.

In an implementation, the function of the first cubic spline curve is obtained in the following manner.

The obtaining module 901 is further configured to obtain a function of a basic mapping curve. The first determining module is further configured to: map the first coordinate value of the first interpolation point and the first coordinate value of the third interpolation point based on the function of the basic mapping curve, to obtain a second coordinate value of the first interpolation point and a second coordinate value of the third interpolation point; determine a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point; and determine the function of the first cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point. In an implementation, the first determining module is configured to determine the second coordinate value of the second interpolation point according to the following equation:

$$VA2 = VA1 + \frac{(TH2 - TH1) \times (VA3 - VA1)}{TH3 - TH1}$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point.

In an implementation, the apparatus further includes: a second determining module, configured to determine, based on the first coordinate value of the third interpolation point and a maximum RGB component value of a first pixel of the to-be-processed image, first coordinate values of a fourth interpolation point, a fifth interpolation point, and a sixth interpolation point related to a second cubic spline curve. The first pixel is a pixel with a largest maximum RGB component value in the to-be-processed image. The maximum RGB component value of the pixel is a largest value of an R component, a G component, and a B component of the pixel. The first coordinate value of the fourth interpolation point, the first coordinate value of the fifth interpolation point, and the first coordinate value of the sixth interpolation point are used to determine a function of the second cubic spline curve. The function of the second cubic spline curve is used to map a luminance value of a pixel whose luminance value is in a second luminance interval in the to-be-processed image to a second target luminance value, to modify the dynamic range of the to-be-processed image. The second luminance interval is an interval between the first coordinate value of the fourth interpolation point and the first coordinate value of the sixth interpolation point. The first luminance interval and the second luminance interval do not overlap.

In an implementation, the apparatus further includes: a sending module, configured to send the functions of the cubic spline curves and data information of the to-be-processed image to a decoder, so that the decoder modifies the dynamic range of the to-be-processed image based on the functions of the cubic spline curves. The data information of the to-be-processed image is used to obtain the to-be-processed image.

In an implementation, the obtaining module is configured to: set the first coordinate value of the first interpolation point to a first preset luminance value, and set the first coordinate value of the third interpolation point to a second preset luminance value.

In an implementation, the first coordinate value of the second interpolation point is determined according to the following equation:

$$TH2 = \frac{\sum_{i=0}^{N_{frame}} f(i)}{N_{frame}}$$

Herein, TH2 is the first coordinate value of the second interpolation point, $N_{frame}$ is a total quantity of pixels whose luminance values are in the first luminance interval in the to-be-processed image, i is an $i^{th}$ pixel in the pixels whose luminance values are in the first luminance interval in the to-be-processed image, and f(i) is a luminance value of the $i^{th}$ pixel.

In an implementation, the second determining module is configured to: determine the first coordinate value of the fourth interpolation point according to a first equation, where the first equation is:

$$TH1\_high = TH3 + \frac{(MaxSource - TH3) \times (U - 2)}{U};$$

determine the first coordinate value of the fifth interpolation point according to a second equation, where the second equation is:

$$TH2\_high = TH3 + \frac{(MaxSource - TH3) \times (U - 1)}{U};$$

and
set the first coordinate value of the sixth interpolation point to the maximum RGB component value of the first pixel.

Herein, TH1_high is the first coordinate value of the fourth interpolation point, TH2_high is the first coordinate value of the fifth interpolation point, a value of MaxSource is the maximum RGB component value of the first pixel, THB is the first coordinate value of the third interpolation point, and U is a preset value.

In an implementation, the second determining module is configured to determine the first coordinate values of the fourth interpolation point, the fifth interpolation point, and the sixth interpolation point in the following manner: determining an initial value of the first coordinate value of the fourth interpolation point based on the first coordinate value of the third interpolation point and the maximum RGB component value of the first pixel; setting the first coordinate value of the sixth interpolation point to the maximum RGB component value of the first pixel; determining a first pixel quantity and a second pixel quantity based on the initial value of the first coordinate value of the fourth interpolation point and the first coordinate value of the sixth interpolation point, where the first pixel quantity is a quantity of pixels whose luminance values are in a third luminance interval in the to-be-processed image, the third luminance interval is an interval between the initial value of the first coordinate value of the fourth interpolation point and the first coordinate value of the sixth interpolation point, and the second pixel quantity is a total quantity of pixels in the to-be-processed image or in a luminance histogram of the to-be-processed image; determining the first coordinate value of the fourth interpolation point based on the first pixel quantity; the second pixel quantity, the first coordinate value of the third interpolation point, the initial value of the first coordinate value of the fourth interpolation point, and the first coordinate value of the sixth interpolation point; and determining the first coordinate value of the fifth interpolation point based on histogram information of the second luminance interval of the to-be-processed image, the first coordinate value of the fourth interpolation point, and the first coordinate value of the sixth interpolation point.

In an implementation, the second luminance interval includes N subintervals, and N is a positive integer. The second determining module is configured to determine the first coordinate value of the fifth interpolation point in the following manner: determining an $i^{th}$ subinterval from the N subintervals, where the $i^{th}$ subinterval is in n subintervals of the N subintervals, a sequence number of the n subintervals is greater than or equal to N/4, the sequence number of the n subintervals is less than or equal to 3N/4, and a quantity of pixels whose luminance values are in the $i^{th}$ subinterval in the to-be-processed image is a smallest value in the n subintervals; and determining the first coordinate value of the fifth interpolation point based on the first coordinate value of the fourth interpolation point, the first coordinate value of the sixth interpolation point, and i.

In I an implementation, a value of N is 8.

In an implementation, the second determining module is configured to determine the initial value of the first coordinate value of the fourth interpolation point according to the following equation:

$$TH1\_high1 = TH3 + \frac{(MaxSource - TH3) \times (U - 2)}{U}$$

Herein, TH1_high1 is the initial value of the first coordinate value of the fourth interpolation point, a value of MaxSource is the maximum RGB component value of the first pixel, U is a preset value, and THB is the first coordinate value of the third interpolation point.

In an implementation, the second determining module is configured to determine the first coordinate value of the fourth interpolation point in the following manner:

determining a ratio of a length of the third luminance interval to the maximum RGB component value of the first pixel; and determining the first coordinate value of the fourth interpolation point according to the following equation:

$$TH1\_high = TH3 + \frac{(MaxSource - TH3) \times (U - 2)}{U} - POW\left(\frac{highRatio}{wholeratio}, j\right) \times \frac{MaxSource - TH3}{U}$$

Herein, TH1_high is the first coordinate value of the fourth interpolation point, a value of MaxSource is the maximum RGB component value of the first pixel, U is a preset value, THB is the first coordinate value of the third interpolation point, highRatio is a ratio of the first pixel quantity to the second pixel quantity, $$wholeratio = \frac{TH3\_high - TH1\_high1}{MaxSource},$$

wholeratio is the ratio of the length of the third luminance interval to the maximum RGB component value of the first pixel, TH1_high1 is the initial value of the first coordinate value of the fourth interpolation point, TH3_high is the first coordinate value of the sixth interpolation point, and POW (x, j) indicates the $j^{th}$ power of x.

In an implementation, the second determining module is configured to determine the first coordinate value of the fifth interpolation point according to the following equation:

$$TH2\_high = \\ TH1\_high + (TH3\_high - TH1\_high) \times \frac{n\_min}{N} + \frac{(TH3\_high - TH1\_high)}{2N}$$

Herein, TH2_high is the first coordinate value of the fifth interpolation point, TH1_high is the first coordinate value of the fourth interpolation point, TH3_high is the first coordinate value of the sixth interpolation point, and n_min is i.

In an implementation, the apparatus further includes:

The second determining module is further configured to: determine a third pixel quantity and a fourth pixel quantity based on a luminance histogram of the to-be-processed image, the first coordinate value of the fourth interpolation point, the first coordinate value of the fifth interpolation point, and the first coordinate value of the sixth interpolation point, where the third pixel quantity is a quantity of pixels in an interval between the first coordinate value of the fourth interpolation point and the first coordinate value of the fifth interpolation point in the luminance histogram, and the fourth pixel quantity is a quantity of pixels in an interval between the first coordinate value of the fifth interpolation point and the first coordinate value of the sixth interpolation point in the luminance histogram; and determine adjustment strength of a second coordinate value of the fifth interpolation point based on the third pixel quantity and the fourth pixel quantity, where the adjustment strength indicates an offset degree of the second coordinate value of the fifth interpolation point relative to an initial value of the second coordinate value of the fifth interpolation point.

In an implementation, the second determining module is configured to determine the adjustment strength of the second coordinate value of the fifth interpolation point according to the following equation:

$$TH\_high\_strength = \begin{cases} TH\_high\_strength1 + \Delta, NUM1 < NUM2 \\ TH\_high\_strength1 + 2\Delta, 2NUM1 < NUM2 \end{cases}$$

Herein, TH_high_strength is the adjustment strength of the second coordinate value of the fifth interpolation point, TH_high_strength1 is a default value of the adjustment strength of the second coordinate value of the fifth interpolation point, $\Delta$ is an adjustment operation, NUM1 is the third pixel quantity, and NUM2 is the fourth pixel quantity.

In an implementation, the initial value of the second coordinate value of the fifth interpolation point is obtained according to the following equation:

$$VA2\_high1 = \\ VA1\_high + \frac{(TH2\_high - TH1\_high) \times (VA3\_high - VA1\_high)}{TH3\_high - TH1\_high}$$

Herein, VA2_high1 is the initial value of the second coordinate value of the fifth interpolation point, VA1_high is a second coordinate value of the fourth interpolation point, VA3_high is a second coordinate value of the sixth interpolation point, TH2_high is the first coordinate value of the fifth interpolation point, TH1_high is the first coordinate value of the fourth interpolation point, and TH3_high is the first coordinate value of the sixth interpolation point.

In an implementation, the function of the basic mapping curve is used to map a luminance value of a pixel in the to-be-processed image to a third target luminance value. The function of the basic mapping curve is a luminance mapping function in which the luminance value of the pixel in the to-be-processed image is an independent variable and the third target luminance value is a dependent variable. The luminance mapping function is expressed as follows:

$$L' = a \times \left(\frac{p \times L^n}{(p-1) \times L^n + 1}\right)^m + b$$

Parameters of the luminance mapping function include a, b, p, m, and n, L' is the third target luminance value, and L is the luminance value of the pixel in the to-be-processed image.

An implementation principle and achieved effect of the apparatus 900 are the same as the implementation principle and achieved effect of the corresponding method part in the foregoing descriptions. Therefore, details are not described herein again.

Figure 10:
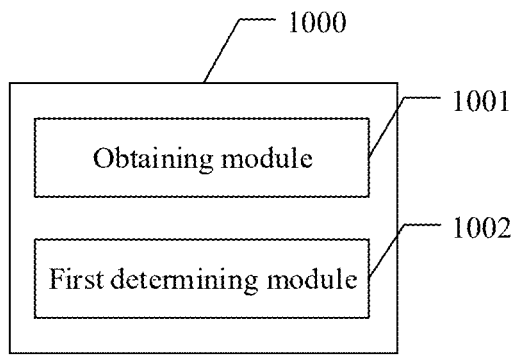
FIG. 10 is a second schematic diagram of a structure of an image dynamic range processing apparatus according to an embodiment of this application.

FIG. 10 is a second schematic diagram of a structure of an image dynamic range processing apparatus according to an embodiment of this application. The apparatus 1000 includes: an obtaining module 1001, configured to obtain a maximum RGB component value of a first pixel of a to-be-processed image, where the first pixel is a pixel with a largest maximum RGB component value in the to-be-processed image, and the maximum RGB component value of the pixel is a largest value of an R component, a G component, and a B component of the pixel; and a first determining module 1002, configured to determine, based on the maximum RGB component value of the first pixel and a luminance histogram of the to-be-processed image, a first coordinate value of an interpolation point related to at least one cubic spline curve. The interpolation point related to each cubic spline curve includes a first interpolation point, a second interpolation point, and a third interpolation point. The first coordinate value of the interpolation point is a luminance value. The first coordinate value of the interpolation point related to each cubic spline curve is used to determine a function of the corresponding cubic spline curve. The function of each cubic spline curve is used to map a luminance value of a pixel whose luminance value is in a corresponding first luminance interval in the to-be-processed image to a first target luminance value, to modify a dynamic range of the to-be-processed image. The first luminance interval corresponding to the function of the cubic spline curve is an interval between a first coordinate value of the first interpolation point and a first coordinate value of the third interpolation point related to the function of the cubic spline curve.

In an implementation, a quantity of the cubic spline curve is one.

The first determining module is further configured to: determine, based on the luminance histogram, a maximum RGB component value of a second pixel corresponding to a first percentage, a maximum RGB component value of a third pixel corresponding to a second percentage, and a maximum RGB component value of a fourth pixel corresponding to a third percentage, where the first percentage indicates a percentage of pixels whose maximum RGB component value is less than or equal to the maximum RGB component value of the second pixel in a plurality of pixels in the to-be-processed image, the second percentage indicates a percentage of pixels whose maximum RGB component value is less than or equal to the maximum RGB component value of the third pixel in the plurality of pixels in the to-be-processed image, and the third percentage indicates a percentage of pixels whose maximum RGB component value is less than or equal to the maximum RGB component value of the fourth pixel in the plurality of pixels in the to-be-processed image; determine the first coordinate value of the first interpolation point based on the maximum RGB component value of the second pixel corresponding to the first percentage, the maximum RGB component value of the third pixel corresponding to the second percentage, and the maximum RGB component value of the fourth pixel corresponding to the third percentage; set the first coordinate value of the third interpolation point to the maximum RGB component value of the first pixel; and determine a first coordinate value of the second interpolation point based on the first coordinate value of the first interpolation point, the first coordinate value of the third interpolation point, and histogram information corresponding to the first luminance interval in the luminance histogram.

In an implementation, the first determining module is configured to determine the first coordinate value of the first interpolation point in the following manner: determining a first value of the first coordinate value of the first interpolation point based on the maximum RGB component value of the second pixel corresponding to the first percentage, the maximum RGB component value of the third pixel corresponding to the second percentage, and a luminance threshold; and determining the first coordinate value of the first interpolation point based on the maximum RGB component value of the second pixel corresponding to the first percentage, the maximum RGB component value of the third pixel corresponding to the second percentage, the maximum RGB component value of the fourth pixel corresponding to the third percentage, and the first value.

In an implementation, the first percentage is 90%, the second percentage is 95%, and the third percentage is 99%.

The determining module is configured to determine the first value of the first coordinate value of the first interpolation point according to the following equation:

$$TH1\_used1 = \frac{\left(g\_maxRGBdistribution90 + \frac{g\_maxRGBdistribution95 - g\_maxRGBdistribution90}{2.0}\right)}{THRESOLD}$$

Herein, TH1_used1 is the first value, g_maxRGBdistribution90 is the maximum RGB component value of the second pixel corresponding to 90%, g_maxRGBdistribution95 is the maximum RGB component value of the third pixel corresponding to 95%, and THRESOLD is the luminance threshold.

In an implementation, the first determining module is configured to determine the first coordinate value of the first interpolation point in the following manner: determining a difference between twice the maximum RGB component value of the third pixel corresponding to the second percentage and the maximum RGB component value of the second pixel corresponding to the first percentage; determining whether the maximum RGB component value of the fourth pixel corresponding to the third percentage is greater than a sum of the obtained difference and a first preset value, and whether the first value is greater than a first threshold; and if yes, setting the first coordinate value of the first interpolation point to the first value.

In an implementation, the first determining module is configured to determine the first coordinate value of the first interpolation point in the following manner: determining, based on the luminance histogram of the to-be-processed image, a maximum RGB component value of a fifth pixel corresponding to a fourth percentage, a maximum RGB component value of a sixth pixel corresponding to a fifth percentage, and a maximum RGB component value of a seventh pixel corresponding to a sixth percentage, where the fourth percentage indicates a percentage of pixels whose maximum RGB component value is less than or equal to the maximum RGB component value of the fifth pixel in a plurality of pixels in the to-be-processed image, the fifth percentage indicates a percentage of pixels whose maximum RGB component value is less than or equal to the maximum RGB component value of the sixth pixel in the plurality of pixels in the to-be-processed image, and the sixth percentage indicates a percentage of pixels whose maximum RGB component value is less than or equal to the maximum RGB component value of the seventh pixel in the plurality of pixels in the to-be-processed image; determining a first value of the first coordinate value of the first interpolation point based on the maximum RGB component value of the fifth pixel corresponding to the fourth percentage, the maximum RGB component value of the second pixel corresponding to the first percentage, and a luminance threshold; determining a second value of the first coordinate value of the first interpolation point based on the maximum RGB component value of the second pixel corresponding to the first percentage, the maximum RGB component value of the third pixel corresponding to the second percentage, and the luminance threshold; determining a third value of the first coordinate value of the first interpolation point based on the maximum RGB component value of the third pixel corresponding to the second percentage, the maximum RGB component value of the fourth pixel corresponding to the third percentage, and the luminance threshold; and determining the first coordinate value of the first interpolation point based on the maximum RGB component value of the fifth pixel corresponding to the fourth percentage, the maximum RGB component value of the sixth pixel corresponding to the fifth percentage, the maximum RGB component value of the second pixel corresponding to the first percentage, the maximum RGB component value of the third pixel corresponding to the second percentage, the maximum RGB component value of the fourth pixel corresponding to the third percentage, the maximum RGB component value of the seventh pixel corresponding to the sixth percentage, and the first value to the third value.

Herein, TH1_used1 is the first value, TH1_used2 is the second value, TH1_used3 is the third value, g_maxRGBdistribution90 is the maximum RGB component value of the second pixel corresponding to 90%, g_maxRGBdistribution95 is the maximum RGB component value of the third pixel corresponding to 95%, g_maxRGBdistribution50 is the maximum RGB component value of the fifth pixel corresponding to 50%, g_maxRGBdistribution99 is the maximum RGB component value of the fourth pixel corresponding to 99%, g_maxRGBdistribution10 is the maximum RGB component value of the sixth pixel corresponding to 10%, and THRESOLD is the luminance threshold.

In an implementation, the first determining module is configured to: determine an initial value of the first coordinate value of the first interpolation point according to a fourth equation:

$$\text{TH1\_used} = \begin{cases} \text{TH1\_used1}, \text{g\_maxRGBdistribution90} > \text{g\_maxRGBdistribution50} - \text{g\_maxRGBdistribution10} + \text{g\_maxRGBdistribution50} + 100 \\ \text{TH1\_used2}, \text{g\_maxRGBdistribution99} > \text{g\_maxRGBdistribution95} - \text{g\_maxRGBdistribution90} + \text{g\_maxRGBdistribution95} + 100 \\ \text{TH1\_used3}, \text{g\_maxRGBdistribution100} > \dfrac{\text{g\_maxRGBdistribution99} - \text{g\_maxRGBdistribution95}}{4.0} + \text{g\_maxRGBdistribution95} + 100 \end{cases};$$

In an implementation, the first percentage is 90%, the second percentage is 95%, the third percentage is 99%, the fourth percentage is 50%, the fifth percentage is 10%, and the sixth percentage is 100%. The first determining module is configured to: determine the first value of the first coordinate value of the first interpolation point according to a first equation, where the first equation is:

and
determine the first coordinate value of the first interpolation point based on the initial value of the first coordinate value of the first interpolation point, the second value, and the third value according to a fifth equation:

$$TH1 = \begin{cases} \text{TH1\_used}, \text{TH1\_used} \geq 0.35 \\ \text{TH1\_used2}, 0.35 > \text{TH1\_used} \text{ and } \text{TH1\_used2} > 0.35 \\ \text{TH1\_used3}, 0.35 > \text{TH1\_used} \text{ and } 0.35 \geq \text{TH1\_used2} \text{ and } \text{TH1\_used3} > 0.35 \end{cases}$$

$$\text{TH1\_used1} = \dfrac{\left(\text{g\_maxRGBdistribution50} + \dfrac{\text{g\_maxRGBdistribution90} - \text{g\_maxRGBdistribution50}}{2.0}\right)}{\text{THRESOLD}};$$

determine the second value of the first coordinate value of the first interpolation point according to a second equation, where the second equation is:

$$\text{TH1\_used2} = \dfrac{\left(\text{g\_maxRGBdistribution90} + \dfrac{\text{g\_maxRGBdistribution95} - \text{g\_maxRGBdistribution90}}{2.0}\right)}{\text{THRESOLD}};$$

and
determine the third value of the first coordinate value of the first interpolation point according to a third equation, where the third equation is:

$$\text{TH1\_used3} = \dfrac{\left(\text{g\_maxRGBdistribution95} + \dfrac{\text{g\_maxRGBdistribution99} - \text{g\_maxRGBdistribution95}}{2.0}\right)}{\text{THRESOLD}}$$

Herein, TH1 is the first coordinate value of the first interpolation point, TH1_used is the initial value of the first coordinate value of the first interpolation point, TH1_used1 is the first value, TH1_used2 is the second value, TH1_used3 is the third value, g_maxRGBdistribution90 is the maximum RGB component value of the second pixel corresponding to 90%, g_maxRGBdistribution95 is the maximum RGB component value of the third pixel corresponding to 95%, g_maxRGBdistribution50 is the maximum RGB component value of the fifth pixel corresponding to 50%, g_maxRGBdistribution99 is the maximum RGB component value of the fourth pixel corresponding to 99%, g_maxRGBdistribution10 is the maximum RGB component value of the sixth pixel corresponding to 10%, and g_maxRGBdistribution100 is the maximum RGB component value of the seventh pixel corresponding to 100%.

In an implementation, the first luminance interval includes N subintervals, and N is a positive integer. The first determining module is configured to determine the first coordinate value of the second interpolation point in the following manner: determining an $i^{th}$ subinterval from the N subintervals, where the $i^{th}$ subinterval is in n subintervals of the N subintervals, a sequence number of the n subintervals is greater than or equal to N/4, the sequence number of the n subintervals is less than or equal to 3N/4, and a quantity of pixels whose luminance values are in the $i^{th}$ subinterval in the to-be-processed image is a smallest value in the n subintervals; and determining the first coordinate value of the second interpolation point based on the first coordinate value of the first interpolation point, the first coordinate value of the third interpolation point, and i.

In an implementation, a value of N is 8.

In an implementation, the first determining module is configured to determine the first coordinate value of the second interpolation point according to the following equation:

$$TH2 = TH1 + (TH3 - TH1) \times \frac{n\_min}{N} + \frac{(TH3 - TH1)}{2N}$$

Herein, TH2 is the first coordinate value of the second interpolation point, TH1 is the first coordinate value of the first interpolation point, THB is the first coordinate value of the third interpolation point, and n_min is i.

In an implementation, the function of the cubic spline curve is obtained in the following manner: The obtaining module is further configured to obtain a function of a basic mapping curve; and the first determining module is further configured to: map the first coordinate value of the first interpolation point and the first coordinate value of the third interpolation point based on the function of the basic mapping curve, to obtain a second coordinate value of the first interpolation point and a second coordinate value of the third interpolation point; determine a second coordinate value of the second interpolation point based on the first coordinate value of the first interpolation point, the first coordinate value of the second interpolation point, the first coordinate value of the third interpolation point, the second coordinate value of the first interpolation point, and the second coordinate value of the third interpolation point; and determine the function of the cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

In an implementation, the first determining module is configured to determine the second coordinate value of the second interpolation point according to the following equation:

$$VA2 = VA1 + \frac{(TH2 - TH1) \times (VA3 - VA1)}{TH3 - TH1}$$

Herein, VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point.

In an implementation, the function of the basic mapping curve is used to map a luminance value of a pixel in the to-be-processed image to a second target luminance value. The function of the basic mapping curve is a luminance mapping function in which the luminance value of the pixel in the to-be-processed image is an independent variable and the second target luminance value is a dependent variable. The luminance mapping function is expressed as follows:

$$L' = a \times \left( \frac{p \times L^n}{(p-1) \times L^n + 1} \right)^m + b$$

Parameters of the luminance mapping function include a, b, p, m, and n, L' is the second target luminance value, and L is the luminance value of the pixel in the to-be-processed image.

In an implementation, the apparatus further includes: a second determining module, configured to: determine a first pixel quantity and a second pixel quantity based on the luminance histogram of the to-be-processed image, the first coordinate value of the first interpolation point, the first coordinate value of the second interpolation point, and the first coordinate value of the third interpolation point, where the first pixel quantity is a quantity of pixels in an interval between the first coordinate value of the first interpolation point and the first coordinate value of the second interpolation point in the luminance histogram, and the second pixel quantity is a quantity of pixels in an interval between the first coordinate value of the second interpolation point and the first coordinate value of the third interpolation point in the luminance histogram; and determine adjustment strength of a second coordinate value of the second interpolation point based on the first pixel quantity and the second pixel quantity, where the adjustment strength indicates an offset degree of the second coordinate value of the second interpolation point relative to an initial value of the second coordinate value of the second interpolation point.

In an implementation, the second determining module is configured to determine the adjustment strength of the second coordinate value of the second interpolation point according to the following equation:

$$TH\_strength = \begin{cases} TH\_strength1 + \Delta, NUM1 < NUM2 \\ TH\_strength1 + 2\Delta, 2NUM1 < NUM2 \end{cases}$$

Herein, TH_strength is the adjustment strength of the second coordinate value of the second interpolation point, TH_strength1 is a default value of the adjustment strength of the second coordinate value of the second interpolation point, $\Delta$ is an adjustment operation, NUM1 is the first pixel quantity, and NUM2 is the second pixel quantity.

In an implementation, the initial value of the second coordinate value of the second interpolation point is obtained according to the following equation:

$$VA21 = VA1 + \frac{(TH2 - TH1) \times (VA3 - VA1)}{TH3 - TH1}$$

Herein, VA21 is the initial value of the second coordinate value of the second interpolation point, VA1 is a second coordinate value of the first interpolation point, VA3 is a second coordinate value of the third interpolation point, TH2 is the first coordinate value of the second interpolation point, TH1 is the first coordinate value of the first interpolation point, and THB is the first coordinate value of the third interpolation point.

An implementation principle and achieved effect of the apparatus 1000 are the same as the implementation principle and achieved effect of the corresponding method part in the foregoing descriptions. Therefore, details are not described herein again.

Figure 11:
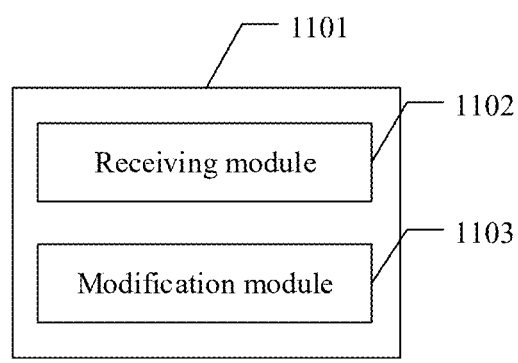
FIG. 11 is a third schematic diagram of a structure of an image dynamic range processing apparatus according to an embodiment of this application.

FIG. 11 is a third schematic diagram of a structure of an image dynamic range processing apparatus according to an embodiment of this application. The apparatus 1100 includes: a receiving module 1101, configured to receive a function of a cubic spline curve and data information of a to-be-processed image that are sent by an encoder, where the data information of the to-be-processed image is used to obtain the to-be-processed image, and the function of the cubic spline curve is used to map a luminance value of a pixel whose luminance value is in a corresponding interval in the to-be-processed image to a target luminance value, to modify a dynamic range of the to-be-processed image; and a modification module 1102, configured to modify the dynamic range of the to-be-processed image based on the function of the cubic spline curve and the data information of the to-be-processed image.

An implementation principle and achieved effect of the apparatus 1100 are the same as the implementation principle and achieved effect of the corresponding method part in the foregoing descriptions. Therefore, details are not described herein again.

Figure 12:
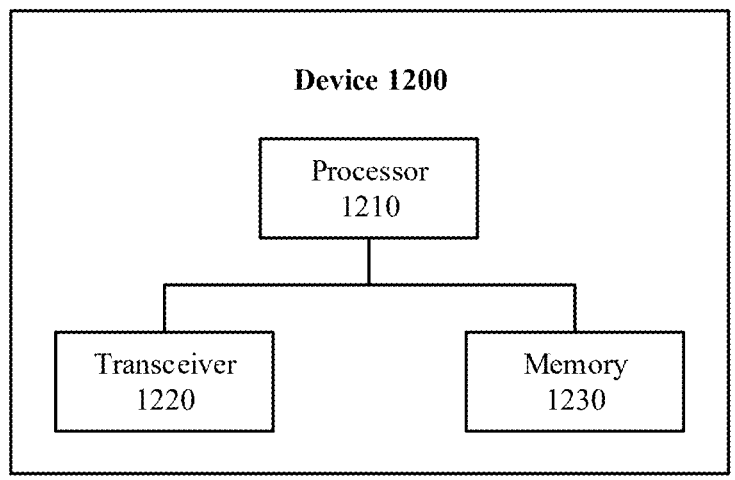
FIG. 12 is a schematic diagram of a structure of an image processing device according to an embodiment of this application.

FIG. 12 shows an image processing device 1200 according to an embodiment of this application. The device 1200 may include a processor 1210, a transceiver 1220, and a memory 1230. The processor 1210, the transceiver 1220, and the memory 1230 communicate with each other through an internal connection path.

The processor 1210 may include one or more processors, for example, include one or more central processing units (CPUs). When the processor is one CPU, the CPU may be a single-core CPU, or may be a multi-core CPU. The processor 1210 is configured to perform the method according to any one of the foregoing method embodiments.

The transceiver 1220 is configured to send and receive data and/or information, and receive data and/or information. The transceiver may include a transmitter and a receiver. The transmitter is configured to send data and/or a signal, and the receiver is configured to receive data and/or a signal.

The memory 1230 includes but is not limited to a random access memory (RAM), a read-only memory (ROM), an erasable programmable memory (EPROM), a compact disc read-only memory (CD-ROM), and the like. The memory 1230 is configured to store a related instruction and data.

The memory 1230 is configured to store program code and data of the apparatus, and may be a separate device or integrated into the processor 1210.

It may be understood that FIG. 12 shows only a simplified design of the device 1200. In actual applications, the device 1200 may further include other necessary elements, including but not limited to any quantity of transceivers, processors, controllers, memories, and the like. All devices that may implement this application fall within the protection scope of this application.

In an implementation, the device 1200 may be replaced with a chip apparatus, for example, may be a communication chip that can be used in the device, and is configured to implement related functions of the processor in the apparatus. The chip apparatus may be a field programmable gate array, a dedicated integrated chip, a system chip, a central processing unit, a network processor, a digital signal processing circuit, a microcontroller, a programmable controller, or another integrated chip for implementing related functions. Optionally, the chip may include one or more memories, configured to store program code. When the code is executed, the processor is enabled to implement a corresponding function.

This application further provides a computer-readable storage medium, including a computer program. When the computer program is executed on a computer, the computer is enabled to perform the technical solutions in the foregoing method embodiments.

This application further provides a computer program. When the computer program is executed on a computer, the computer program is used to perform the technical solutions in the foregoing method embodiments.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image dynamic range processing method, comprising:
obtaining, by a processor, a first coordinate value of a first interpolation point and a first coordinate value of a third interpolation point related to a first cubic spline curve, wherein the first coordinate value of the first interpolation point and the first coordinate value of the third interpolation point are luminance values;
determining, by a processor, based on histogram information of a first luminance interval of a to-be-processed image, a first coordinate value of a second interpolation point related to the first cubic spline curve, wherein
the first coordinate value of the second interpolation point is calculated based on a distribution of pixel luminance values within the first luminance interval;
the first luminance interval of the to-be-processed image is an interval between the first coordinate value of the first interpolation point and the first coordinate value of the third interpolation point; and
the first coordinate value of the first interpolation point, the first coordinate value of the second interpolation point, and the first coordinate value of the third interpolation point are used to determine a function of the first cubic spline curve;
mapping a luminance value of a pixel whose luminance value is in the first luminance interval in the to-be-processed image to a first target luminance value based on the function of the first cubic spline curve to modify a dynamic range of the to-be-processed image; and
sending the to-be-processed image to a display device for displaying in accordance with the modified dynamic range.

2. The method according to claim 1, wherein the function of the first cubic spline curve is obtained in the following manner:
obtaining a function of a basic mapping curve;
mapping the first coordinate value of the first interpolation point and the first coordinate value of the third interpolation point based on the function of the basic mapping curve, to obtain a second coordinate value of the first interpolation point and a second coordinate value of the third interpolation point;

determining a second coordinate value of the second interpolation point according to the following equation:

$$VA2 = VA1 + \frac{(TH2 - TH1) \times (VA3 - VA1)}{TH3 - TH1},$$

wherein
VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point; and
determining the function of the first cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

3. The method according to claim 1, wherein the method further comprises:
determining, based on the first coordinate value of the third interpolation point and a maximum RGB component value of a first pixel of the to-be-processed image, first coordinate values of a fourth interpolation point, a fifth interpolation point, and a sixth interpolation point related to a second cubic spline curve, wherein the first pixel is a pixel with a largest maximum RGB component value in the to-be-processed image, and the maximum RGB component value of the pixel is a largest value of an R component, a G component, and a B component of the pixel; and
wherein the first coordinate value of the fourth interpolation point, the first coordinate value of the fifth interpolation point, and the first coordinate value of the sixth interpolation point are used to determine a function of the second cubic spline curve, the function of the second cubic spline curve is used to map a luminance value of a pixel whose luminance value is in a second luminance interval in the to-be-processed image to a second target luminance value, to modify the dynamic range of the to-be-processed image, the second luminance interval is an interval between the first coordinate value of the fourth interpolation point and the first coordinate value of the sixth interpolation point, and the first luminance interval and the second luminance interval do not overlap.

4. The method according to claim 1, wherein the first coordinate value of the second interpolation point is determined according to the following equation:

$$TH2 = \frac{\sum_{i=0}^{N_{frame}} f(i)}{N_{frame}},$$

wherein
TH2 is the first coordinate value of the second interpolation point, $N_{frame}$ is a total quantity of pixels whose luminance values are in the first luminance interval in the to-be-processed image, i is an $i^{th}$ pixel in the pixels whose luminance values are in the first luminance interval in the to-be-processed image, and f(i) is a luminance value of the $i^{th}$ pixel.

5. The method according to claim 3, wherein the determining, based on the first coordinate value of the third interpolation point and the maximum RGB component value of the first pixel of the to-be-processed image, the first coordinate values of the fourth interpolation point, the fifth interpolation point, and the sixth interpolation point related to the second cubic spline curve comprises:
determining the first coordinate value of the fourth interpolation point according to a first equation, wherein the first equation is:

$$TH1\_high = TH3 + \frac{(MaxSource - TH3) \times (U - 2)}{U};$$

determining the first coordinate value of the fifth interpolation point according to a second equation, wherein the second equation is:

$$TH2\_high = TH3 + \frac{(MaxSource - TH3) \times (U - 1)}{U};$$

and
setting the first coordinate value of the sixth interpolation point to the maximum RGB component value of the first pixel, wherein
TH1_high is the first coordinate value of the fourth interpolation point, TH2_high is the first coordinate value of the fifth interpolation point, a value of MaxSource is the maximum RGB component value of the first pixel, THB is the first coordinate value of the third interpolation point, and U is a preset value.

6. The method according to claim 3, wherein the determining, based on the first coordinate value of the third interpolation point and the maximum RGB component value of the first pixel of the to-be-processed image, the first coordinate values of the fourth interpolation point, the fifth interpolation point, and the sixth interpolation point related to the second cubic spline curve comprises:
determining an initial value of the first coordinate value of the fourth interpolation point according to the following equation:

$$TH1\_high1 = TH3 + \frac{(MaxSource - TH3) \times (U - 2)}{U},$$

wherein
TH1_high1 is the initial value of the first coordinate value of the fourth interpolation point, a value of MaxSource is the maximum RGB component value of the first pixel, U is a preset value, and THB is the first coordinate value of the third interpolation point;
setting the first coordinate value of the sixth interpolation point to the maximum RGB component value of the first pixel;
determining a first pixel quantity and a second pixel quantity based on the initial value of the first coordinate value of the fourth interpolation point and the first coordinate value of the sixth interpolation point, wherein the first pixel quantity is a quantity of pixels whose luminance values are in a third luminance interval in the to-be-processed image, the third luminance interval is an interval between the initial value of the first coordinate value of the fourth interpolation point and the first coordinate value of the sixth interpolation point, and the second pixel quantity is a total quantity of pixels in the to-be-processed image or in a luminance histogram of the to-be-processed image;
determining the first coordinate value of the fourth interpolation point based on the first pixel quantity, the second pixel quantity, the first coordinate value of the third interpolation point, the initial value of the first coordinate value of the fourth interpolation point, and the first coordinate value of the sixth interpolation point; and
determining the first coordinate value of the fifth interpolation point based on histogram information of the second luminance interval of the to-be-processed image, the first coordinate value of the fourth interpolation point, and the first coordinate value of the sixth interpolation point.

7. The method according to claim 6, wherein the second luminance interval comprises N subintervals, N is a positive integer, and the determining the first coordinate value of the fifth interpolation point based on histogram information of the second luminance interval of the to-be-processed image, the first coordinate value of the fourth interpolation point, and the first coordinate value of the sixth interpolation point comprises:
determining an $i^{th}$ subinterval from the N subintervals, wherein the $i^{th}$ subinterval is in n subintervals of the N subintervals, a sequence number of the n subintervals is greater than or equal to N/4, the sequence number of the n subintervals is less than or equal to 3N/4, and a quantity of pixels whose luminance values are in the $i^{th}$ subinterval in the to-be-processed image is a smallest value in the n subintervals; and
determining the first coordinate value of the fifth interpolation point based on the first coordinate value of the fourth interpolation point, the first coordinate value of the sixth interpolation point, and i.

8. The method according to claim 6, wherein the determining the first coordinate value of the fourth interpolation point based on the first pixel quantity, the second pixel quantity, the first coordinate value of the third interpolation point, the initial value of the first coordinate value of the fourth interpolation point, and the first coordinate value of the sixth interpolation point comprises:
determining a ratio of a length of the third luminance interval to the maximum RGB component value of the first pixel; and
determining the first coordinate value of the fourth interpolation point according to the following equation:

$$TH1\_high = TH3 + \frac{(MaxSource - TH3) \times (U - 2)}{U} - POW\left(\frac{highRatio}{wholeratio}, j\right) \times \frac{MaxSource - TH3}{U},$$

wherein
TH1_high is the first coordinate value of the fourth interpolation point, a value of MaxSource is the maximum RGB component value of the first pixel, U is a preset value, THB is the first coordinate value of the third interpolation point, highRatio is a ratio of the first pixel quantity to the second pixel quantity, $$wholeratio = \frac{TH3\_high - TH1\_high1}{MaxSource},$$

whole ratio is the ratio of the length of the third luminance interval to the maximum RGB component value of the first pixel, TH1_high1 is the initial value of the first coordinate value of the fourth interpolation point, TH3_high is the first coordinate value of the sixth interpolation point, and POW(x, j) indicates the $j^{th}$ power of x.

9. The method according to claim 3, wherein the method further comprises:
determining a third pixel quantity and a fourth pixel quantity based on a luminance histogram of the to-be-processed image, the first coordinate value of the fourth interpolation point, the first coordinate value of the fifth interpolation point, and the first coordinate value of the sixth interpolation point, wherein the third pixel quantity is a quantity of pixels in an interval between the first coordinate value of the fourth interpolation point and the first coordinate value of the fifth interpolation point in the luminance histogram, and the fourth pixel quantity is a quantity of pixels in an interval between the first coordinate value of the fifth interpolation point and the first coordinate value of the sixth interpolation point in the luminance histogram; and
determining adjustment strength of a second coordinate value of the fifth interpolation point according to the following equation:

$$TH\_high\_strength = \begin{cases} TH\_high\_strength1 + \Delta, & NUM1 < NUM2 \\ TH\_high\_strength1 + 2\Delta, & 2NUM1 < NUM2 \end{cases},$$

wherein
TH_high_strength is the adjustment strength of the second coordinate value of the fifth interpolation point, TH_high_strength1 is a default value of the adjustment strength of the second coordinate value of the fifth interpolation point, L is an adjustment operation, NUM1 is the third pixel quantity, and NUM2 is the fourth pixel quantity;
wherein the adjustment strength indicates an offset degree of the second coordinate value of the fifth interpolation point relative to an initial value of the second coordinate value of the fifth interpolation point.

10. An image processing device, comprising:
a processor; and
a memory;
wherein the processor is coupled to the memory, and the processor is configured to enable the image processing device to:
obtain a first coordinate value of a first interpolation point and a first coordinate value of a third interpolation point related to a first cubic spline curve generated by a display device, wherein the first coordinate value of the first interpolation point and the first coordinate value of the third interpolation point are luminance values; and
determine, based on histogram information of a first luminance interval of a to-be-processed image, a first coordinate value of a second interpolation point related to the first cubic spline curve, wherein the first coordinate value of the second interpolation point is calculated based on a distribution of pixel luminance values within the first luminance interval;
the first luminance interval of the to-be-processed image is an interval between the first coordinate value of the first interpolation point and the first coordinate value of the third interpolation point; and
the first coordinate value of the first interpolation point, the first coordinate value of the second interpolation point, and the first coordinate value of the third interpolation point are used to determine a function of the first cubic spline curve;
map a luminance value of a pixel whose luminance value is in the first luminance interval in the to-be-processed image to a first target luminance value based on the function of the first cubic spline curve to modify a dynamic range of the to-be-processed image; and
send the to-be-processed image to the display device for displaying in accordance with the modified dynamic range.

11. The image processing device according to claim 10, wherein the processor is further configured to enable the image processing device to:
obtain a function of a basic mapping curve;
map the first coordinate value of the first interpolation point and the first coordinate value of the third interpolation point based on the function of the basic mapping curve, to obtain a second coordinate value of the first interpolation point and a second coordinate value of the third interpolation point;
determine a second coordinate value of the second interpolation point according to the following equation:

$$VA2 = VA1 + \frac{(TH2 - TH1) \times (VA3 - VA1)}{TH3 - TH1},$$

wherein
VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point; and
determine the function of the first cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

12. The image processing device according to claim 10, wherein the processor is further configured to enable the image processing device to:
determine, based on the first coordinate value of the third interpolation point and a maximum RGB component value of a first pixel of the to-be-processed image, first coordinate values of a fourth interpolation point, a fifth interpolation point, and a sixth interpolation point related to a second cubic spline curve, wherein the first pixel is a pixel with a largest maximum RGB component value in the to-be-processed image, and the maximum RGB component value of the pixel is a largest value of an R component, a G component, and a B component of the pixel; and the first coordinate value of the fourth interpolation point, the first coordinate value of the fifth interpolation point, and the first coordinate value of the sixth interpolation point are used to determine a function of the second cubic spline curve, the function of the second cubic spline curve is used to map a luminance value of a pixel whose luminance value is in a second luminance interval in the to-be-processed image to a second target luminance value, to modify the dynamic range of the to-be-processed image, the second luminance interval is an interval between the first coordinate value of the fourth interpolation point and the first coordinate value of the sixth interpolation point, and the first luminance interval and the second luminance interval do not overlap.

13. The image processing device according to claim 10, wherein the first coordinate value of the second interpolation point is determined according to the following equation:

$$TH2 = \frac{\sum_{i=0}^{N_{frame}} f(i)}{N_{frame}},$$

wherein

TH2 is the first coordinate value of the second interpolation point, $N_{frame}$ is a total quantity of pixels whose luminance values are in the first luminance interval in the to-be-processed image, i is an $i^{th}$ pixel in the pixels whose luminance values are in the first luminance interval in the to-be-processed image, and f(i) is a luminance value of the $i^{th}$ pixel.

14. The image processing device according to claim 12, wherein the processor is further configured to enable the image processing device to:

determine the first coordinate value of the fourth interpolation point according to a first equation, wherein the first equation is:

$$TH1\_high = TH3 + \frac{(MaxSource - TH3) \times (U - 2)}{U};$$

determine the first coordinate value of the fifth interpolation point according to a second equation, wherein the second equation is:

$$TH2\_high = TH3 + \frac{(MaxSource - TH3) \times (U - 1)}{U};$$

and set the first coordinate value of the sixth interpolation point to the maximum RGB component value of the first pixel, wherein TH1_high is the first coordinate value of the fourth interpolation point, TH2_high is the first coordinate value of the fifth interpolation point, a value of MaxSource is the maximum RGB component value of the first pixel, THB is the first coordinate value of the third interpolation point, and U is a preset value.

15. The image processing device according to claim 12, wherein the processor is further configured to enable the image processing device to:

determine an initial value of the first coordinate value of the fourth interpolation point according to the following equation:

$$TH1\_high1 = TH3 + \frac{(MaxSource - TH3) \times (U - 2)}{U},$$

wherein

TH1_high1 is the initial value of the first coordinate value of the fourth interpolation point, a value of MaxSource is the maximum RGB component value of the first pixel, U is a preset value, and THB is the first coordinate value of the third interpolation point;

set the first coordinate value of the sixth interpolation point to the maximum RGB component value of the first pixel;

determine a first pixel quantity and a second pixel quantity based on the initial value of the first coordinate value of the fourth interpolation point and the first coordinate value of the sixth interpolation point, wherein the first pixel quantity is a quantity of pixels whose luminance values are in a third luminance interval in the to-be-processed image, the third luminance interval is an interval between the initial value of the first coordinate value of the fourth interpolation point and the first coordinate value of the sixth interpolation point, and the second pixel quantity is a total quantity of pixels in the to-be-processed image or in a luminance histogram of the to-be-processed image;

determine the first coordinate value of the fourth interpolation point based on the first pixel quantity, the second pixel quantity, the first coordinate value of the third interpolation point, the initial value of the first coordinate value of the fourth interpolation point, and the first coordinate value of the sixth interpolation point; and determine the first coordinate value of the fifth interpolation point based on histogram information of the second luminance interval of the to-be-processed image, the first coordinate value of the fourth interpolation point, and the first coordinate value of the sixth interpolation point.

16. The image processing device according to claim 12, wherein the processor is further configured to enable the image processing device to:

determine a third pixel quantity and a fourth pixel quantity based on a luminance histogram of the to-be-processed image, the first coordinate value of the fourth interpolation point, the first coordinate value of the fifth interpolation point, and the first coordinate value of the sixth interpolation point, wherein the third pixel quantity is a quantity of pixels in an interval between the first coordinate value of the fourth interpolation point and the first coordinate value of the fifth interpolation point in the luminance histogram, and the fourth pixel quantity is a quantity of pixels in an interval between the first coordinate value of the fifth interpolation point and the first coordinate value of the sixth interpolation point in the luminance histogram; and determining adjustment strength of a second coordinate value of the fifth interpolation point according to the following equation:

$$\text{TH\_high\_strength} = \begin{cases} \text{TH\_high\_strength1} + \Delta, & NUM1 < NUM2 \\ \text{TH\_high\_strength1} + 2\Delta, & 2NUM1 < NUM2 \end{cases},$$

wherein

TH_high_strength is the adjustment strength of the second coordinate value of the fifth interpolation point, TH_high_strength1 is a default value of the adjustment strength of the second coordinate value of the fifth interpolation point, L is an adjustment operation, NUM1 is the third pixel quantity, and NUM2 is the fourth pixel quantity;

wherein the adjustment strength indicates an offset degree of the second coordinate value of the fifth interpolation point relative to an initial value of the second coordinate value of the fifth interpolation point.

17. A non-transitory computer-readable storage medium storing a computer program, which, when executed by a processor of an image processing device, cause the image processing device to:

obtain a first coordinate value of a first interpolation point and a first coordinate value of a third interpolation point related to a first cubic spline curve generated by a display device, wherein the first coordinate value of the first interpolation point and the first coordinate value of the third interpolation point are luminance values;

determining, based on histogram information of a first luminance interval of a to-be-processed image, a first coordinate value of a second interpolation point related to the first cubic spline curve, wherein the first coordinate value of the second interpolation point is calculated based on a distribution of pixel luminance values within the first luminance interval;

the first luminance interval of the to-be-processed image is an interval between the first coordinate value of the first interpolation point and the first coordinate value of the third interpolation point; and the first coordinate value of the first interpolation point, the first coordinate value of the second interpolation point, and the first coordinate value of the third interpolation point are used to determine a function of the first cubic spline curve;

map a luminance value of a pixel whose luminance value is in the first luminance interval in the to-be-processed image to a first target luminance value based on the function of the first cubic a spline curve to modify a dynamic range of the to-be-processed image; and send the to-be-processed image to the display device for displaying in accordance with the modified dynamic range.

18. The non-transitory computer-readable storage medium according to claim 17, wherein the computer program is further enabling the computer or the processor to:

obtain a function of a basic mapping curve;

map the first coordinate value of the first interpolation point and the first coordinate value of the third interpolation point based on the function of the basic mapping curve, to obtain a second coordinate value of the first interpolation point and a second coordinate value of the third interpolation point;

determine a second coordinate value of the second interpolation point according to the following equation:

$$VA2 = VA1 + \frac{(TH2 - TH1) \times (VA3 - VA1)}{TH3 - TH1},$$

wherein

VA2 is the second coordinate value of the second interpolation point, VA1 is the second coordinate value of the first interpolation point, VA3 is the second coordinate value of the third interpolation point, TH2 is the first coordinate value of the second interpolation point, TH1 is the first coordinate value of the first interpolation point, and TH3 is the first coordinate value of the third interpolation point; and determine the function of the first cubic spline curve based on the first coordinate value of the first interpolation point, the first coordinate value of the second interpolation point, the first coordinate value of the third interpolation point, the second coordinate value of the first interpolation point, the second coordinate value of the third interpolation point, and the second coordinate value of the second interpolation point.

19. The non-transitory computer-readable storage medium according to claim 17, wherein the computer program is further enabling the computer or the processor to:

determine, based on the first coordinate value of the third interpolation point and a maximum RGB component value of a first pixel of the to-be-processed image, first coordinate values of a fourth interpolation point, a fifth interpolation point, and a sixth interpolation point related to a second cubic spline curve, wherein the first pixel is a pixel with a largest maximum RGB component value in the to-be-processed image, and the maximum RGB component value of the pixel is a largest value of an R component, a G component, and a B component of the pixel; and the first coordinate value of the fourth interpolation point, the first coordinate value of the fifth interpolation point, and the first coordinate value of the sixth interpolation point are used to determine a function of the second cubic spline curve, the function of the second cubic spline curve is used to map a luminance value of a pixel whose luminance value is in a second luminance interval in the to-be-processed image to a second target luminance value, to modify the dynamic range of the to-be-processed image, the second luminance interval is an interval between the first coordinate value of the fourth interpolation point and the first coordinate value of the sixth interpolation point, and the first luminance interval and the second luminance interval do not overlap.

20. The computer-readable storage medium according to claim 19, wherein the computer program is further enabling the computer or the processor to:

determine the first coordinate value of the fourth interpolation point according to a first equation, wherein the first equation is:

$$TH1\_high = TH3 + \frac{(MaxSource - TH3) \times (U - 2)}{U};$$

determine the first coordinate value of the fifth interpolation point according to a second equation, wherein the second equation is:

$$TH2\_high = TH3 + \frac{(MaxSource - TH3) \times (U - 1)}{U};$$

and set the first coordinate value of the sixth interpolation point to the maximum RGB component value of the first pixel, wherein TH1_high is the first coordinate value of the fourth interpolation point, TH2_high is the first coordinate value of the fifth interpolation point, a value of MaxSource is the maximum RGB component value of the first pixel, THB is the first coordinate value of the third interpolation point, and U is a preset value.

\* \* \* \* \*